United States Patent
Moore et al.

(10) Patent No.: US 11,174,019 B2
(45) Date of Patent: Nov. 16, 2021

(54) VTOL M-WING CONFIGURATION

(71) Applicant: Joby Aero, Inc., Santa Cruz, CA (US)

(72) Inventors: Mark Moore, San Francisco, CA (US); John Conway Badalamenti, San Francisco, CA (US); Ian Villa, San Francisco, CA (US); Adam Warmoth, San Francisco, CA (US); David Josephson, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 204 days.

(21) Appl. No.: 16/179,940

(22) Filed: Nov. 3, 2018

(65) Prior Publication Data
US 2019/0135425 A1   May 9, 2019

Related U.S. Application Data

(60) Provisional application No. 62/666,659, filed on May 3, 2018, provisional application No. 62/581,623, filed on Nov. 3, 2017.

(51) Int. Cl.
*B64C 29/00* (2006.01)
*B64C 9/02* (2006.01)
(Continued)

(52) U.S. Cl.
CPC ............ *B64C 29/0033* (2013.01); *B64C 3/10* (2013.01); *B64C 9/02* (2013.01); *B64C 11/48* (2013.01);
(Continued)

(58) Field of Classification Search
CPC ......... B64C 29/0033; B64C 3/10; B64C 9/02; B64C 11/48; B64C 11/18; B64C 15/02;
(Continued)

(56) References Cited

U.S. PATENT DOCUMENTS

| 1,652,554 A | 12/1927 | Bolgiano |
| 2,925,130 A | 2/1960 | Buivid |

(Continued)

FOREIGN PATENT DOCUMENTS

| CH | 677844 | 6/1991 |
| CN | 111433122 | 7/2020 |

(Continued)

OTHER PUBLICATIONS

Uber, "Fast-Forwarding to a Future of On-Demand Urban Air Transportation", Uber Elevate, (Oct. 27, 2016), 98 pgs.
(Continued)

*Primary Examiner* — Richard R. Green
*Assistant Examiner* — Arfan Y. Sinaki
(74) *Attorney, Agent, or Firm* — Schwegman Lundberg & Woessner, P.A.

(57) ABSTRACT

A vertical landing and take-off aircraft VTOL transitions from a vertical takeoff state to a cruise state where the vertical takeoff state uses propellers to generate lift and the cruise state uses wings to generate lift. The aircraft has an M-wing configuration with propellers located on the wingtip nacelles, wing booms, and tail boom. The wing boom and/or the tail boom can include boom control effectors. Hinged control surfaces on the wings, tail boom, and tail tilt during takeoff and landing to yaw the vehicle. The boom control effectors, cruise propellers, stacked propellers, and control surfaces can have different positions during different modes of operation in order to control aircraft movement and mitigate noise generated by the aircraft.

19 Claims, 14 Drawing Sheets

(51) Int. Cl.
  *G05D 1/08* (2006.01)
  *B64C 11/48* (2006.01)
  *B64C 3/10* (2006.01)
  *B64D 27/24* (2006.01)
  *B64D 35/06* (2006.01)

(52) U.S. Cl.
  CPC ............. *B64D 27/24* (2013.01); *B64D 35/06* (2013.01); *G05D 1/0858* (2013.01)

(58) Field of Classification Search
  CPC .. B64D 27/24; B64D 35/06; B64D 2027/026; G05D 1/0858
  See application file for complete search history.

(56) References Cited

U.S. PATENT DOCUMENTS

| | | | |
|---|---|---|---|
| 2,940,689 A | 6/1960 | Howell | |
| 3,061,242 A | 10/1962 | Mitchell et al. | |
| 3,089,666 A | 5/1963 | Quenzler | |
| 3,096,041 A | 7/1963 | Clifford et al. | |
| 3,097,701 A | 7/1963 | Buivid | |
| 3,139,244 A | 6/1964 | Bright | |
| 3,260,476 A | 7/1966 | James | |
| 3,490,720 A | 1/1970 | Girard | |
| 3,528,630 A | 9/1970 | Ferris et al. | |
| 3,693,910 A | 9/1972 | Aldi | |
| 4,037,807 A | 7/1977 | Johnston et al. | |
| 4,504,029 A | 3/1985 | Erickmann | |
| 4,789,115 A | 12/1988 | Koutsoupidis | |
| 4,936,526 A | 6/1990 | Gries | |
| 5,295,643 A | 3/1994 | Ebbert et al. | |
| 5,454,531 A | 10/1995 | Melkuti | |
| 5,971,320 A | 10/1999 | Jermyn et al. | |
| 6,237,872 B1 * | 5/2001 | Bar-Levav ............. B64D 11/00 105/314 | |
| 6,254,032 B1 | 7/2001 | Bucher | |
| 6,293,491 B1 | 9/2001 | Wobben | |
| 6,340,133 B1 | 1/2002 | Capanna | |
| 6,607,161 B1 | 8/2003 | Krysinski et al. | |
| 7,699,260 B2 | 4/2010 | Hughey | |
| 8,181,903 B2 | 5/2012 | Posva | |
| 8,272,593 B2 | 9/2012 | Choi | |
| 9,096,314 B2 | 8/2015 | Brotherton-ratcliffe et al. | |
| 9,115,774 B2 | 8/2015 | Long | |
| 9,169,027 B2 | 10/2015 | Strauss et al. | |
| 9,187,174 B2 | 11/2015 | Shaw | |
| 9,481,457 B2 | 11/2016 | Alber | |
| 10,081,436 B1 | 9/2018 | Tian | |
| 10,179,647 B1 | 1/2019 | Meugnier et al. | |
| 10,364,024 B2 | 7/2019 | Tighe et al. | |
| 10,501,173 B1 | 12/2019 | Douglas et al. | |
| 2002/0104921 A1 | 8/2002 | Louvel | |
| 2003/0062443 A1 | 4/2003 | Wagner et al. | |
| 2003/0080242 A1 | 5/2003 | Kawai | |
| 2003/0085319 A1 | 5/2003 | Wagner et al. | |
| 2003/0094537 A1 | 5/2003 | Austen-brown | |
| 2005/0109879 A1 | 5/2005 | Patterson | |
| 2006/0016930 A1 | 1/2006 | Pak | |
| 2006/0226281 A1 | 10/2006 | Walton | |
| 2007/0018035 A1 | 1/2007 | Saiz et al. | |
| 2007/0034736 A1 | 2/2007 | Ferrer | |
| 2007/0187547 A1 | 8/2007 | Kelly | |
| 2008/0168961 A1 | 7/2008 | Prior et al. | |
| 2009/0214338 A1 | 8/2009 | Werle et al. | |
| 2009/0308685 A1 | 12/2009 | Gorny et al. | |
| 2010/0301168 A1 | 12/2010 | Raposo | |
| 2011/0001001 A1 | 1/2011 | Bryant | |
| 2011/0147512 A1 | 6/2011 | Cranga | |
| 2012/0012692 A1 | 1/2012 | Kroo | |
| 2012/0061509 A1 | 3/2012 | Brunken, Jr. | |
| 2012/0267473 A1 | 10/2012 | Tao et al. | |
| 2013/0020429 A1 | 1/2013 | Kroo | |
| 2013/0062455 A1 | 3/2013 | Lugg et al. | |
| 2013/0062457 A1 | 3/2013 | Deakin | |
| 2013/0062463 A1 * | 3/2013 | Lord ........................ F02C 6/206 244/55 | |
| 2013/0251525 A1 | 9/2013 | Saiz | |
| 2013/0264429 A1 | 10/2013 | Miodushevsky | |
| 2013/0306403 A1 | 11/2013 | Todorovic | |
| 2014/0070051 A1 | 3/2014 | Kreitmair-steck et al. | |
| 2015/0021442 A1 | 1/2015 | Hunter | |
| 2015/0056058 A1 | 2/2015 | Grissom et al. | |
| 2015/0102175 A1 | 4/2015 | Guetta | |
| 2015/0125268 A1 | 5/2015 | Koopmann et al. | |
| 2015/0136897 A1 | 5/2015 | Seibel et al. | |
| 2015/0144742 A1 | 5/2015 | Moxon | |
| 2015/0210380 A1 | 7/2015 | Fischer et al. | |
| 2015/0239559 A1 | 8/2015 | Uskert et al. | |
| 2015/0266571 A1 * | 9/2015 | Bevirt ................. B64C 29/0033 244/7 C | |
| 2015/0314865 A1 * | 11/2015 | Bermond ............ B64C 29/0033 244/17.27 | |
| 2016/0031554 A1 | 2/2016 | Eshkenazy et al. | |
| 2016/0052626 A1 | 2/2016 | Vander Mey | |
| 2016/0207625 A1 | 7/2016 | Judas et al. | |
| 2016/0214712 A1 | 7/2016 | Fisher et al. | |
| 2016/0221671 A1 | 8/2016 | Fisher et al. | |
| 2016/0236774 A1 * | 8/2016 | Niedzballa ............. B64D 27/24 | |
| 2016/0311530 A1 * | 10/2016 | Smith ..................... B64C 27/82 | |
| 2016/0318600 A1 | 11/2016 | Wirasnik | |
| 2017/0101186 A1 * | 4/2017 | Starke ................ B64D 11/0605 | |
| 2017/0137122 A1 * | 5/2017 | Kooiman ................ F16H 1/006 | |
| 2017/0174337 A1 | 6/2017 | Roberts et al. | |
| 2017/0183081 A1 | 6/2017 | Du et al. | |
| 2017/0274983 A1 * | 9/2017 | Beckman ............... B64C 11/28 | |
| 2017/0349274 A1 | 12/2017 | Fenny et al. | |
| 2018/0105279 A1 | 4/2018 | Tighe et al. | |
| 2018/0171865 A1 | 6/2018 | Kim et al. | |
| 2018/0194484 A1 | 7/2018 | Livieratos et al. | |
| 2018/0208311 A1 | 7/2018 | Zhang et al. | |
| 2018/0339761 A1 | 11/2018 | Mccullough et al. | |
| 2019/0061901 A1 | 2/2019 | Long | |
| 2019/0135408 A1 | 5/2019 | Moore et al. | |
| 2019/0135413 A1 | 5/2019 | Moore et al. | |
| 2019/0135427 A1 | 5/2019 | Robertson et al. | |
| 2019/0263515 A1 | 8/2019 | Karem et al. | |
| 2019/0315471 A1 | 10/2019 | Moore et al. | |
| 2019/0322366 A1 | 10/2019 | Gaffney et al. | |
| 2019/0337613 A1 | 11/2019 | Villa et al. | |
| 2019/0337614 A1 | 11/2019 | Villa et al. | |
| 2019/0375495 A1 * | 12/2019 | Pfammatter ............ B64C 27/28 | |
| 2020/0017228 A1 | 1/2020 | Combs et al. | |
| 2020/0115045 A1 | 4/2020 | Mermoz et al. | |
| 2020/0130810 A1 * | 4/2020 | Elson ...................... B64D 9/00 | |

FOREIGN PATENT DOCUMENTS

| | | |
|---|---|---|
| DE | 8337724.7 | 4/1985 |
| GB | 433989 | 8/1935 |
| GB | 2468917 | 9/2010 |
| WO | 2017106617 | 6/2017 |
| WO | 2019090191 | 5/2019 |

OTHER PUBLICATIONS

PCT International Search Report and Written Opinion, PCT Application No. PCT/US2018/059111, dated Mar. 5, 2019, 22 pages.
"U.S. Appl. No. 16/179,941, First Action Interview—Pre-Interview Communication dated Jan. 22, 2020", 5 pgs.
"U.S. Appl. No. 16/179,941, First Action Interview—Office Action Summary dated Apr. 16, 2020", 6 pgs.
"U.S. Appl. No. 16/179,939, Final Office Action dated Feb. 12, 2021", 15 pgs.
"U.S. Appl. No. 16/179,939, Response filed Jan. 6, 2021 to First Action Interview—Office Action Summary dated Nov. 6, 2020", 8 pgs.
"U.S. Appl. No. 16/179,941, Final Office Action dated Jan. 8, 2021", 20 pgs.
"U.S. Appl. No. 16/179,941, Response filed Jun. 11, 2020 to First Action Interview—Office Action Summary dated Apr. 16, 2020", 10 pgs.

(56) References Cited

OTHER PUBLICATIONS

"U.S. Appl. No. 16/179,939, First Action Interview—Pre-Interview Communication dated Aug. 27, 2020", 10 pgs.
"U.S. Appl. No. 16/179,939, Response to Pre-Interview Communication filed Sep. 28, 2020", 3 pgs.
"U.S. Appl. No. 16/179,939, First Action Interview—Office Action Summary dated Nov. 6, 2020", 4 pgs.
"European Application Serial No. 18872947.9, Extended European Search Report dated Nov. 23, 2020", 8 pgs.
"U.S. Appl. No. 16/179,939, Response filed Sep. 23, 2021 to Non Final Office Action dated May 24, 2021", 10 pgs.
U.S. Appl. No. 16/179,941, filed Nov. 3, 2018, Stacked Propellers.
U.S. Appl. No. 16/179,939, filed Nov. 3, 2018, Boom Control Effectors.
"U.S. Appl. No. 16/179,941, Response filed Apr. 8, 2021 to Final Office Action dated Jan. 8, 2021", 11 pgs.
"U.S. Appl. No. 16/179,939, Response filed May 12, 2021 to Final Office Action dated Feb. 12, 2021", 9 pgs.
"U.S. Appl. No. 16/179,939, Non Final Office Action dated May 24, 2021", 16 pgs.

\* cited by examiner

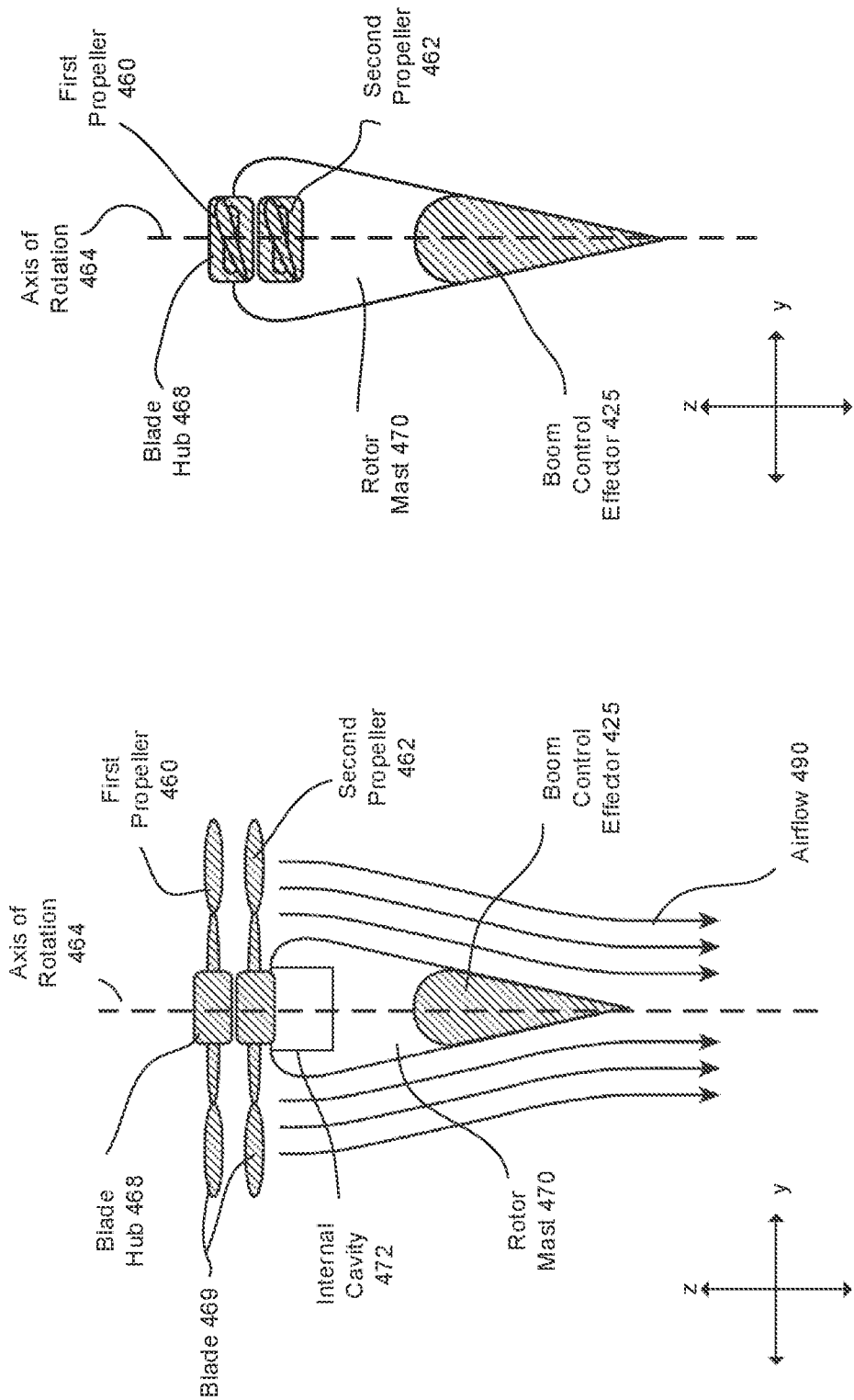

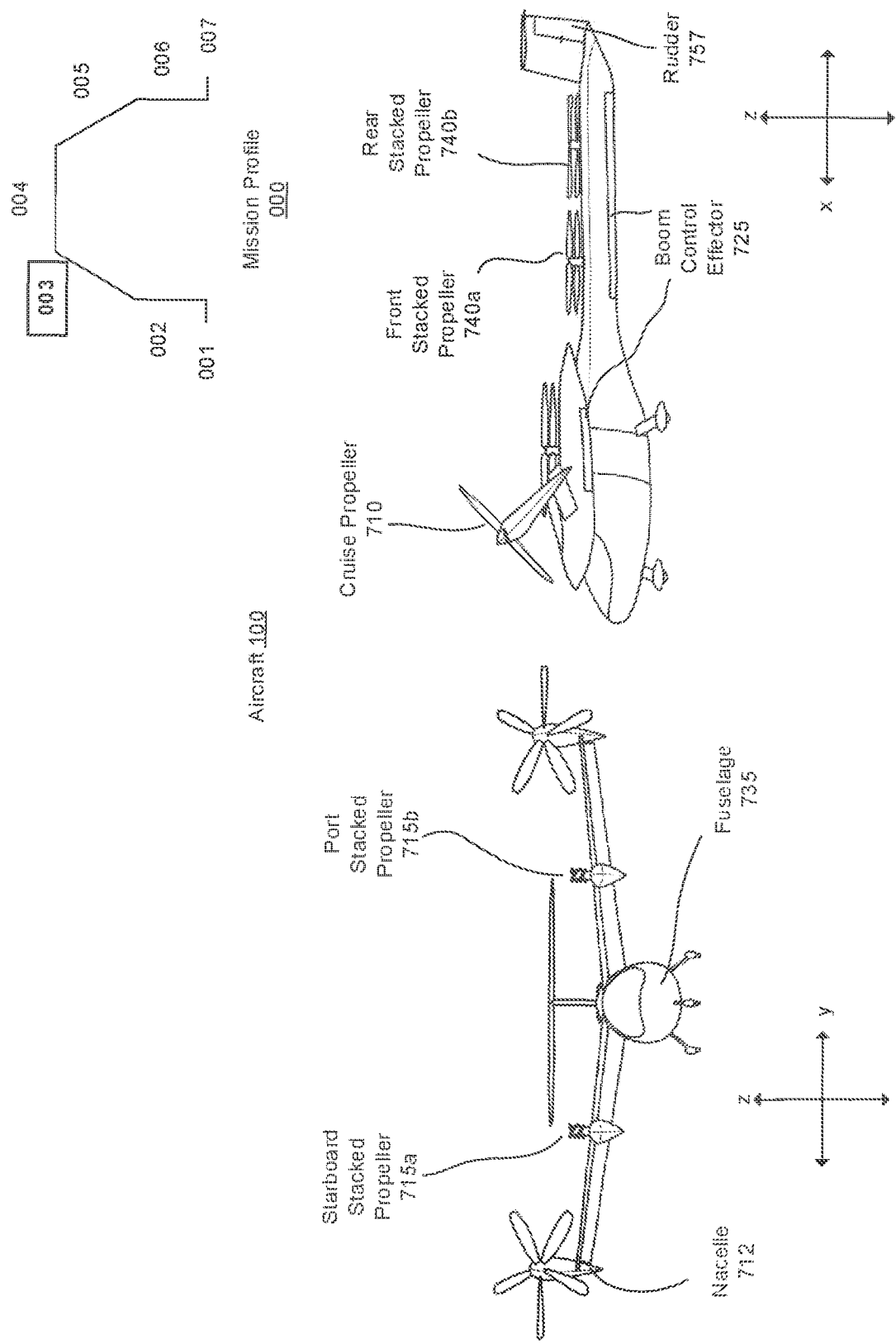

VTOL M-WING CONFIGURATION

TECHNICAL FIELD

The described subject matter generally relates to the field of aerial transportation and, more particularly, to a vehicle for vertical takeoff and landing that can serve multiple purposes, including the transportation of passengers and cargo.

BACKGROUND

Some existing vehicles in the emerging vertical takeoff and landing (VTOL) aircraft ecosystem rely on separate non-articulating rotors to provide vertical lift and forward thrust. However, this approach results in extra motor weight and aircraft drag since vertical lift rotors are ineffective during forward flight. Other existing aircrafts use a distributed set of tilting propulsors that rotate in the direction of flight to provide both vertical lift and forward thrust. While this approach reduces motor weight and aircraft drag, the articulating motor and propulsors result in increased design complexity with six to twelve tilting rotors required to provide the necessary lift and thrust.

SUMMARY

In various embodiments, the above and other problems are addressed by a VTOL aircraft that transitions from a vertical takeoff and landing state primarily using stacked propellers for lift to a cruise primarily using one or more wings for lift. In one embodiment, the aircraft has an M-wing configuration with propellers located on wingtip nacelles, wing booms, and a tail boom. The wing boom and/or the tail boom can include boom control effectors. Each propeller may be powered by a separate electric motor. Hinged control surfaces on the wings, tail boom, and tail may tilt during takeoff and landing to yaw the vehicle.

During vertical ascent of the aircraft, rotating wingtip propellers on the nacelles are pitched upward at a 90-degree angle and stacked lift propellers are deployed from the wing and tail booms to provide lift. The hinged control surfaces tilt to control rotation about the vertical axis during takeoff. As the aircraft transitions to a cruise configuration, the nacelles rotate downward to a zero-degree position, allowing the wingtip propellers to provide forward thrust. Control surfaces return to a neutral position with the wings, tail boom, and tail, and the stacked lift propellers stop rotating and retract into cavities in the wing booms and tail boom to reduce drag during forward flight.

During transition to a descent configuration, the stacked propellers are redeployed from the wing booms and the tail boom and begin to rotate along the wings and tail to generate the lift required for descent. The nacelles rotate back upward to a 90-degree position and provide both thrust and lift during the transition. The hinged control surfaces on the wings are pitched downward to avoid the propeller wake, and the hinged surfaces on the tail boom and tail tilt for yaw control.

BRIEF DESCRIPTION OF THE DRAWINGS

FIG. 4A illustrates a configuration of a stacked propeller during a first mode of operation, in accordance with one or more embodiments.

FIG. 4B illustrates a configuration of a stacked propeller during a second mode of operation, in accordance with one or more embodiments.

FIG. 7A illustrates a late egress transition configuration of a VTOL aircraft, in accordance with the embodiment of FIG. 1.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

1.1 Aircraft Overview

Figure 1:
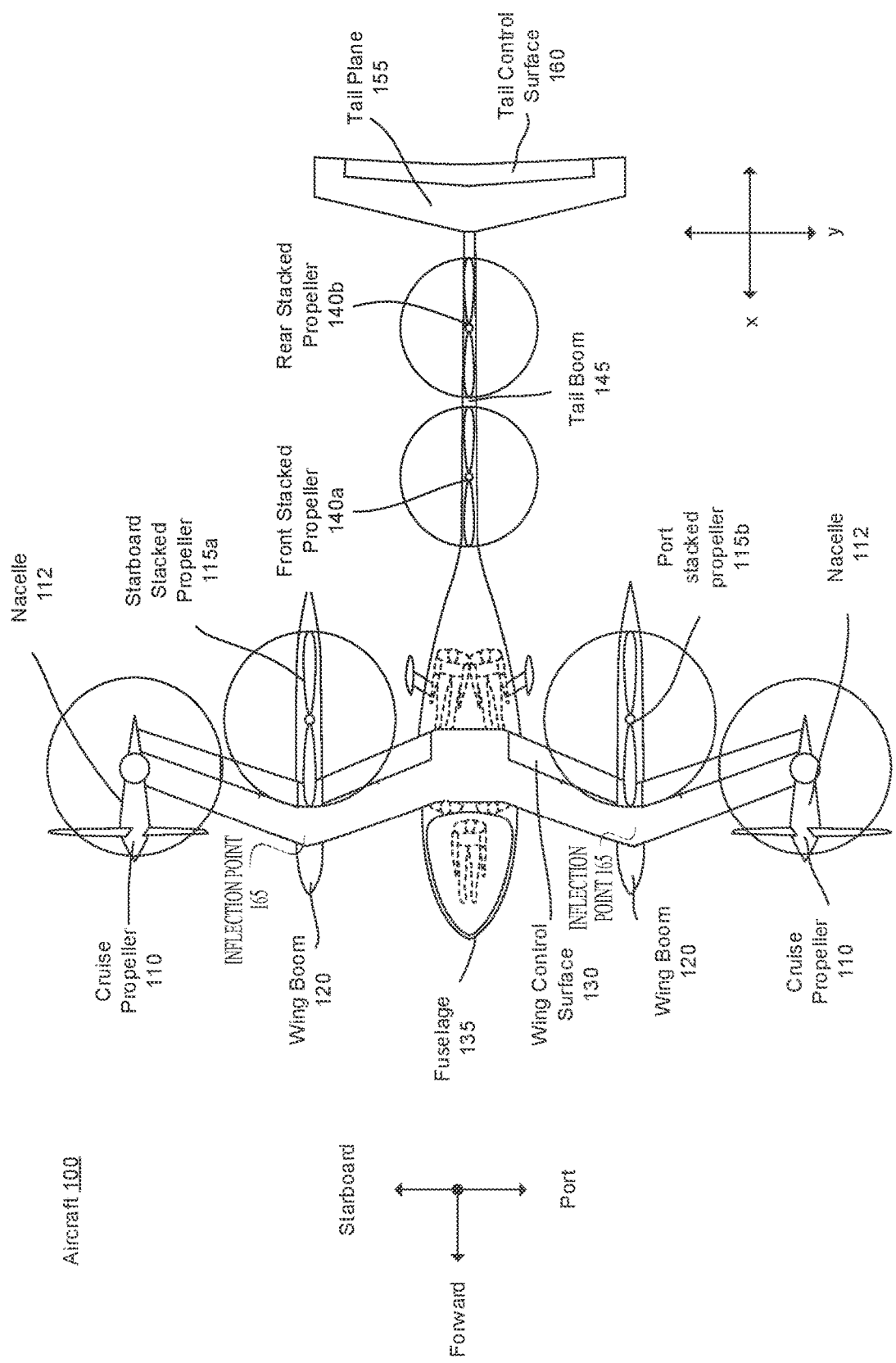
FIG. 1 illustrates an M-wing configuration of a VTOL aircraft, in accordance with one or more embodiments.

FIG. 1 is an illustration of a vertical takeoff and landing (VTOL) aircraft 100, according to one or more embodiments. The illustrated VTOL aircraft 100 is a transitional aircraft that transitions from a vertical takeoff state to a cruise state where the vertical takeoff state uses propellers to generate lift and the cruise state uses wings to generate lift. The aircraft 100 is used for transporting passengers and cargo. The aircraft 100 is configured to move with respect to three axes. In FIG. 1, a roll axis is collinear with the x-axis and a pitch axis is collinear with the y-axis. A yaw axis is collinear with the z-axis, which is perpendicular to the x-axis and the y-axis (e.g., the z-axis extends from the page). The origin of the coordinate system is fixed to the center of gravity of the aircraft 100 during one or more modes of operation.

The aircraft 100 includes an aerodynamic center and a center of thrust. The aerodynamic center is a point of an aircraft where the aerodynamic moment is constant. The aerodynamic moment is produced as a result of forces exerted on the aircraft 100 by the surrounding gas (e.g., air). The center of thrust is the point along the aircraft 100 where thrust is applied. The aircraft 100 includes components strategically designed and located so that the aerodynamic center, center of thrust and/or center of gravity can be approximately aligned. (e.g., separated by a distance of no more than five feet (1.524 meters)) during various modes of operation. The components of the aircraft 100 are arranged such that the aircraft 100 is balanced during vertical and forward flight. For example, components such as the control surfaces (e.g., tail control surface, boom control effectors), propellers, and M-wing shape function cooperatively to balance the aircraft 100 during different modes of operation.

The aircraft 100 includes an M-wing configured to the body of a fuselage 135 and a tail region extending from the rear of the fuselage 135. In the embodiment of FIG. 1, the aircraft 100 includes a port portion and a starboard portion. The wing is arranged in an M-configuration such that the port portion and the starboard portion of the wing each has two angled segments that merge at an inflection point 165. A first segment extends outwardly from the fuselage 135 to an inflection point 165 and a second segment extends outwardly from the inflection point 165. The first segment and the second segment are joined at a non-zero angle at the inflection point 165. In various embodiments, the angle ranges from 5-25 degrees. In other embodiments, other angles may be used.

The leading edge where the angled segments merge (e.g., the inflection point 165) is the forward most point along each portion of the M-wing. The leading edge is the part of the wing that first contacts the air during forward flight. In one embodiment, the inflection point 165 where the angled components merge coincides with the midpoint of each portion (e.g., port portion, starboard portion) of the wing. In one embodiment, the port portion and the starboard portion of the wing can be individual components, each having a wide v-shape. In the embodiment of FIG. 1, the wing is a continuous M-configuration, but in alternative embodiments the wing includes two separate v-wings starboard, port) that are attached to the fuselage 135.

The shape of the M-wing is selected to reduce the surface area creating drag during take-off and landing configurations while providing sufficient lift during forward flight. In one embodiment, the wing span is approximately 30 to 40 feet and the distance from the tip of a starboard cruise propeller 110 to a port cruise propeller 110 (described in greater detail below) is approximately 40 to 50 feet. The wing surface area is approximately 110 to 120 square feet. Alternatively, the wing can have any suitable dimensions for providing lift to the aircraft.

In one embodiment, the M-wing includes wing booms 120 where the leading edge of each wing boom 120 is located at the approximate midpoint of each portion of the wing (e.g., the inflection point 165 where the angled segments of each portion of the wing merge). The wing booms 120 can be attached to the wing at the leading edge and may protrude 1 to 3 feet from the leading edge. In one embodiment, the center of mass of the wing booms 120 is on or ahead of the neutral axis of the wings. The wing booms 120 can include additional elements, such as batteries, to align and/or balance the center of gravity of the aircraft 100 during a mode of operation.

In one embodiment, a stacked propeller (e.g., starboard stacked propeller 115a, port stacked propeller 115b) can be attached to a wing boom 120. A stacked propeller (e.g., starboard stacked propeller 115a, port stacked propeller 115b) can be located behind the wing in order to provide lift and stability to the aircraft 100. Locating a stacked propeller behind the wing allows for improved circulation over the wing and the stacked propeller. As a result, the stacked propeller can provide a significant contribution to lift during vertical takeoff and landing. The location of the stacked propeller also allows for alignment of the aerodynamic center, the center of thrust, and the center of gravity of the aircraft during different modes of operation.

The aircraft 100 includes a tail region attached to the rear end of the fuselage 135. The tail region can include a tail boom 145 and a tail. In one embodiment, the aircraft includes a T-tail configured to provide stability to the aircraft 100. The T-tail is shaped and located in a position to provide lift to the aircraft in nominal operation. As such, the T-tail can be referred to as a lifting tail. The T-tail includes a tail plane 155 mounted perpendicularly to the top of a fin 448. The fin 448 is shown in a profile view of the aircraft 100 in FIG. 4E and can include a rudder 457 that rotates to control yaw motion of the aircraft 100. The tail plane 155 attached to the top of the fin 448 can include one or more tail control surfaces 160 located at the rear of the tail plane 155. In one embodiment, the T-tail is configured to position the aerodynamic center over a specified passenger seat (e.g., a rear passenger seat) so that it is coincident (or approximately coincident) with the center of gravity during vertical flight. The T-tail can also contribute to adjusting the aerodynamic center towards the nose of the fuselage 135 (e.g., slightly ahead of the wing) during a cruise configuration.

The T-tail is approximately 4 to 6 feet tall from the base of the fin 448 to the top of the tail plane 155 and the tail plane 155 is approximately 10 to 20 feet wide. The T-tail can be tall enough so that the angle of the tail control surface 160 can be varied when one or more propellers attached to a tail boom induces a negative airflow angle of attack during a transition configuration (e.g., egress and ingress described in greater detail below). Varying the tail control surface may reduce any negative impacts of the airflow generated by the propellers on the T-tail during transition. In one embodiment, a navigation light is located on the rear of the tail to alert other aircrafts of the position and heading of the aircraft 100. Propellers (e.g., front stacked propeller 140a, rear stacked propeller 140b) can be attached to the tail boom 145. Alternatively, one or more propellers can be located at any point along the tail region. Similarly to the stacked wing propellers (e.g., starboard stacked propeller 115a, port stacked propeller 115b), a tail propeller(s) can be located strategically along the tail to contribute to alignment of the aerodynamic center, the center of thrust, and the center of gravity.

The aircraft 100 relies on propellers for vertical takeoff and landing as described below in relation to FIG. 5 and FIG. 11. The aircraft 100 includes stacked propellers (a starboard stacked propeller 115a, a port stacked propeller 115b, a front stacked propeller 140a, a rear stacked propeller 140b) and single rotor propellers (cruise propellers 110) in order to maximize lift. The propellers may be oriented along the span (e.g, laterally) of the aircraft 100 to prevent interference of propeller flows during transition and to minimize power required to transition from a vertical configuration to a cruise configuration. The position of the propellers may prevent turbulent wake flow (e.g., turbulent air flow produced by a propeller) ingestion between propellers. The propellers can be located so that the airflow of one propeller does not negatively interfere with the airflow of another propeller. The arrangement of the propellers may also allow for a more elliptically shaped lift and downwash airflow distribution during transition configurations to achieve lower induced drag, power, and noise. In one embodiment, the aircraft 100 has approximately 331 square feet of propeller area such that, an aircraft 100 with a mass of approximately 4500 pounds has a disc loading is approximately 13.6 pounds per square foot. The disc loading is the average pressure change across an actuator disc, more specifically across a rotor or propeller. In other embodiments in which the propeller area is approximately 391 square feet (e.g., if the diameter of the cruise propellers 110 and stacked wing propellers is approximately 10 feet), the disc loading is reduced to 11.5. Power usage may be decreased when the disc loading is reduced, thus efficiency of an aircraft can be increased by reducing the disc loading. The combination and configuration of the propellers of the aircraft 100 yields a disc loading that allows the aircraft 100 to generate enough lift to transport a large load using a reasonable amount of power without generating excessive noise.

1.2 Aircraft Fuselage

Shown in FIG. 1, the fuselage 135 is located at the center of the wingspan and includes a passenger compartment configured to accommodate passengers, cargo, and/or a pilot. The fuselage 135 is approximately 35 to 45 feet long, approximately 4 to 8 feet wide, and approximately 5 to 12 feet tall. In alternative embodiments, the fuselage 135 can have any suitable dimensions for transporting passengers and/or cargo.

The passenger compartment may include one or more seats for passengers. In one embodiment, the passenger compartment includes seating for up to four passengers. Seating may be arranged in two parallel rows of two seats such that the one row of passengers faces the tail of the aircraft 100 while the other row of passengers faces the nose (e.g., forward region of the fuselage 135) of the aircraft 100. In one embodiment, the passenger seating can be tiered such that one row of seats is elevated above the other row of seats to maximize space and provide a place for passengers to rest their feet. Alternatively, the seating may be arranged in a single row with two sets of two seats, each of the seats in the set facing opposite directions such that the passengers in the first and third seats face the tail of the aircraft 100 while passengers in the second and fourth seats face the nose of the aircraft 100. In other configurations, all four seats face the nose or tail of the aircraft 100. The arrangement of passenger seats may have alternate configurations in order to distribute the passenger weight in a specific manner such that the aircraft 100 is balanced during a mode of operation. In other embodiments, the fuselage 135 can include a larger or smaller number of seats.

The fuselage 135 can also include a view screen in the passenger compartment for providing information about the flight. For example, the view screen can include information such as estimated arrival time, altitude, speed, information about origin and destination locations, and/or communications from the pilot. The forward region (e.g., region closest to the nose of the aircraft 100) of the fuselage 135 includes a cockpit with a control panel and seating for a pilot. In one embodiment, the front of the cockpit is located ahead of the horizontal plane of the cruise propellers 110 such that the blades of the cruise propellers 110 are not in line with the pilot.

In some embodiments, a battery pack is located below the passenger compartment in the fuselage 135. The battery pack is separated from the bottom surface of the fuselage 135 to facilitate ventilation of the battery pack. The bottom surface of the fuselage 135 can also include a battery door to allow for removal of the battery pack. In alternative embodiments, the batteries can be placed above the fuselage 135 and integral to the wing. The fuselage 135 can include a charging port on the nose where the aircraft 100 may be attached to a charging station to restore electrical power stored in the batteries that power the aircraft 100. Fixed or retractable landing gear may also be attached to the bottom of the fuselage 135 to facilitate landing of the aircraft 100 and allow the aircraft 100 to move short distances on the ground. Alternatively, the aircraft 100 may have landing skis protruding from the bottom of the fuselage 135 and include attachment points for wheels.

1.3 Control Surfaces

In the embodiment of FIG. 1, the aircraft 100 includes wing control surfaces 130 that span the trailing edge of the wing. The trailing edge is the edge opposite to the leading edge of the wing. In one embodiment, each wing portion has three wing control surfaces 130 along the rear of the wing: a first wing control surface approximately 5 to 7 feet long between the fuselage 135 and a wing boom 120, and a second and third wing control surface each approximately 3 to 5 feet long between the wing boom 120 and a wingtip nacelle 112. The wing control surfaces 130 can be deployed at different angles during aircraft operation to increase the lift generated by the wing and to control the pitch of the aircraft 100. The wing control surfaces 130 are hinged such that they can rotate about a hinging axis that is parallel to the wing. For example, the wing control surfaces 130 are in a neutral position during a parked configuration and are rotated approximately 40 degrees below a plane parallel to the x-y plane to facilitate takeoff. The modes of operation of the wing control surfaces 130 are described in more detail below in relation to FIGS. 5-11.

The aircraft 100 can also include control surfaces in other locations along the aircraft such as the tail control surface 160 (described above) and the rudder 457 (shown in FIG. 4E). The control surfaces on the tail (e.g., tail control surface 160, rudder 457) can adjust the aerodynamic center of the aircraft 100 such that the aircraft 100 is dynamically stable in different modes of operation. For example, the tail control surface 160 is neutral (i.e., tilted to a zero-degree angle) during a cruise configuration, and the tail control surface 160 tilts approximately 5 to 10 degrees during descent. The rudder 457 is neutral (i.e., tilted to a zero-degree angle) during a transition to a cruise configuration, and the rudder 457 tilts approximately 5 to 10 degrees during descent to yaw the aircraft 100 into the correct orientation for landing. The rudder 457 can operate in addition to or instead of boom control effectors, described below, for yaw control. The modes of operation of the tail control surface 160 and the rudder 457 are described in greater detail below in relation to FIGS. 5-11.

In some configurations, the aircraft 100 can include control surfaces on the bottom of each of the wing booms 120 and the tail boom 145 that tilt to yaw the aircraft 100. The control surfaces can deflect propeller flow to create control forces resulting in yaw and direct sideslip capabilities. For example, while the control surfaces are neutral (i.e., at zero degrees) during a cruise configuration, they rotate slightly (e.g., at approximately five to ten degrees) during descent to yaw the aircraft 100 into the correct orientation. In one embodiment, the control surfaces on the bottom of each of the wing booms 120 and the tail boom 145 are boom control effectors, described in greater detail below.

1.4 Cruise Propellers

In one embodiment, an aircraft 100 includes one or more cruise propellers 110 shown in FIG. 1. The cruise propellers 110 provide lift to the aircraft 100 during takeoff and landing and forward thrust to the aircraft 100 during a cruise configuration. Shown in FIG. 1, the cruise propellers 110 are mounted on nacelles 112 perpendicular to the fuselage 135. In one embodiment, the nacelles 112 have a non-circular cross section to reduce the effect of aerodynamic forces on the aircraft 100. Each nacelle 112 rotates about an axis parallel to the y-axis during different modes of operation. As discussed in more detail below in relation to FIGS. 5-11, during vertical takeoff and landing the nacelles 112 are perpendicular to the fuselage 135 such that the blades of the cruise propellers 110 rotate in a plane parallel to the x-y plane, facilitating vertical movement of the aircraft 100. As the aircraft 100 enters an egress configuration (i.e., when the aircraft 100 is approaching a cruising altitude), the nacelles 112 and cruise propellers 110 rotate downward (e.g, towards the nose of the fuselage 135 about an axis parallel to the y-axis) until the nacelles are parallel to the fuselage 135, facilitating forward thrust of the aircraft 100. As the aircraft 100 enters an ingress configuration (i.e., when the aircraft 100 begins to descend), the nacelles 112 and cruise propellers 110 rotate upward (about an axis parallel to the y-axis towards the positive z-direction) until the blades of the cruise propellers 110 are level in a plane parallel to the x-y plane, where they remain during descent and landing of the aircraft 100. In one embodiment, the cruise propellers 110 can be counter-rotating. For example, the port cruise propeller 110 rotates in a clockwise direction and the starboard cruise propeller 110 rotates in a counterclockwise direction during a mode of operation.

In one embodiment, each of the cruise propellers 110 has five blades, although they may have fewer or more blades in other embodiments. The blades of the cruise propellers 110 narrow from the root of the blade to the tip. The cruise propellers 110 may have a fixed pitch (e.g., the cruise propellers 110 are held at a fixed angle of attack). Alternatively, the pitch is variable such that the blades of the cruise propellers 110 can be partially rotated to control the blade pitch. The cruise propellers 110 can be driven by separate electric motors. Each cruise propeller 110 is approximately 8 to 10 feet in diameter and is attached at a 90-degree angle to a nacelle 112 (e.g., the nacelles 112 are parallel with the z-axis) at a free end of each portion (e.g., starboard portion, port portion) of the wing. Alternatively, the cruise propellers 110 can have any suitable dimensions.

1.5 Stacked Propellers

An aircraft may include one or more stacked propellers. The propellers can be located on the front, back, port and/or starboard region of the aircraft. In the embodiment of FIG. 1, the aircraft 100 includes a starboard stacked propeller 115a and a port stacked propeller 115b where the starboard stacked propeller 115a and the port stacked propeller 115b can be attached to a wing or a wing boom 120 of the aircraft. The embodiment of FIG. 1 also includes stacked tail propellers (e.g., front stacked propeller 140a, rear stacked propeller 140b) that can be attached to the tail boom 145. Alternatively, a stacked propeller can be located in any other position on the aircraft 100.

Figure 2B:
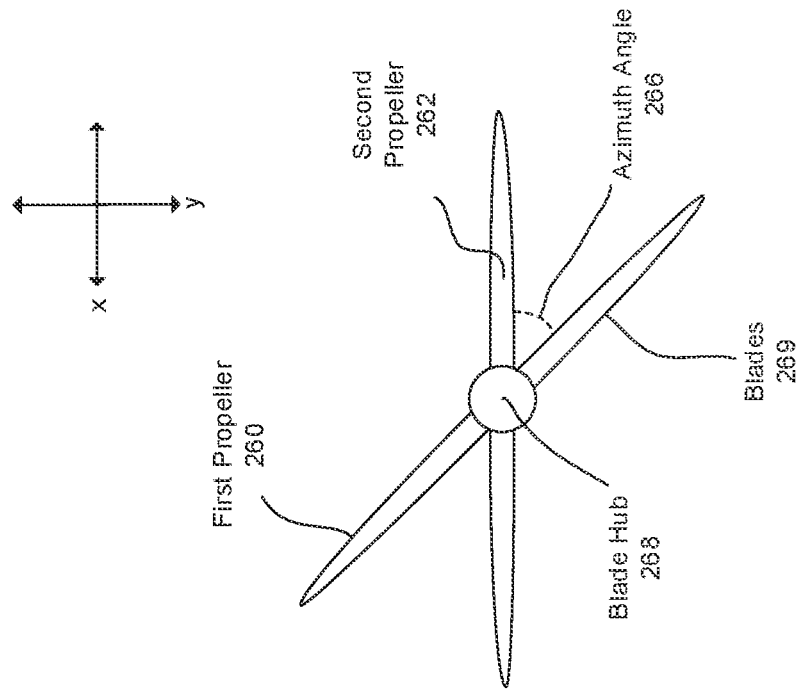
FIG. 2B is a top view of a stacked propeller, in accordance with one or more embodiments.
Figure 2A:
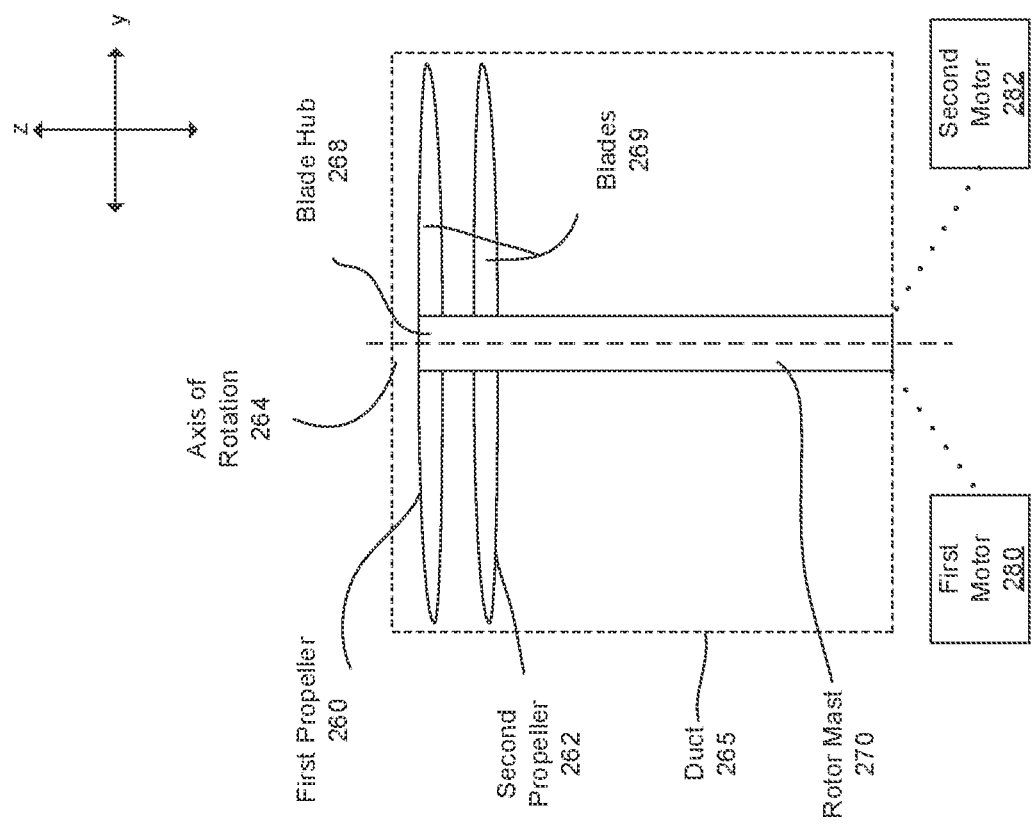
FIG. 2A is a side view of a stacked propeller, in accordance with one or more embodiments.

A stacked propeller (e.g., starboard stacked propeller 115a, port stacked propeller 115b, front stacked propeller 140a, rear stacked propeller 140b) functions to provide lift and thrust to an aircraft during takeoff and landing. FIGS. 2A and 2B illustrate a side view and a top view of a stacked propeller, according to an embodiment. The stacked propeller includes a first propeller 260 and a second propeller 262. The first propeller 260 and the second propeller 262 each include two blades 269 coupled to a blade hub 268. The blades 269 of the first propeller 260 and the second propeller 262 co-rotate about an axis of rotation 264. The first propeller 260 and the second propeller 262 can have a variable pitch.

The first propeller 260 can be coupled (e.g., mechanically, electrically) to a first motor 280 and the second propeller 262 can be coupled to a second motor 282 to enable independent control of each propeller. The first motor 280 or the second motor 282 can control both the first propeller 260 and the second propeller 262 in some embodiments. For instance, if the first motor 280 fails (e.g., battery dies), the second motor 282 can control the rotation of the first propeller 260 and the second propeller 262. A stacked propeller can also include a clutch which allows the first propeller 260 and the second propeller 262 to lock together to ensure an appropriate azimuth angle 266 during a mode of operation. A clutch allows for a stacked propeller to provide thrust from both the first propeller 260 and the second propeller 262, even in a case where one of the motors (e.g, first motor 280) fails and the other motor (e.g., second motor 282) controls the rotation of the first propeller 260 and the second propeller 262. In some embodiments, a stacked propeller can include a single motor and a controller with a clutch used to control the azimuth angle 266 that is used in a mode of operation, and in other embodiments a stacked propeller can include two motors with independent controllers and a clutch used in a case when one of the motors fails. The first motor 280 and the second motor 282 can also control the precise azimuth angle 266, shown in FIG. 2B, of the first propeller 260 relative to the second propeller 262, when the blades are stationary or in motion. The azimuth angle 266 depends on the mode of operation of the aircraft, described in greater detail below.

The co-rotating propellers (e.g. first propeller 260, second propeller 262) may be synchronized such that they rotate at the same speed to reduce the noise generated by the aircraft 100. The azimuth angle 266 is constant when the first propeller 260 and second propeller 262 are rotating at the same speed (e.g., during steady flight). The azimuth angle 266 can depend on the shape of the blade 269 and/or the mode of operation. For instance, a specified shape, such as the shape shown in FIG. 2B, can have an offset angle of 5-15 degrees during different modes of operation.

The speed of the propellers may be adjusted based on the amount of thrust required to provide vertical ascent and descent and the amount of noise allowable in the geographic area in which the aircraft 100 is traveling. For example, the pilot might lower the speed of the aircraft 100, causing the aircraft 100 to climb more slowly, in areas in which a lower level of noise is desirable (e.g., residential areas). In one embodiment, the maximum speed of a free end of each of the blades 269 is 450 feet per second. This may keep the noise produced by the aircraft 100 below an acceptable threshold. In other embodiments, other maximum speeds may be acceptable (e.g., depending on the level of noise considered acceptable for the aircraft and/or aircraft environment, depending on the shape and size of the blades 269, etc.).

In one embodiment, a stacked propeller can be encapsulated in a duct 265. The duct 265 can surround the blades 269 and a rotor mast 270 to augment the flow over the first propeller 260 and/or the second propeller 262. The duct 265 can function to increase the thrust generated by a stacked propeller and/or adjust the pressure difference above and below the co-rotating propellers. The first propeller 260 and the second propeller 262 can be recessed within the duct 265, shown in FIG. 2A. In alternative embodiments, the first propeller 260 can be protruding from or flush with the duct 265 while the second propeller 262 is recessed within the duct 265. Similarly, the rotor mast 270 can be recessed within or protruding from the duct 265. In the embodiment of FIG. 2A, the duct 265 is a cylindrical body with a diameter slightly larger than the diameter of the first propeller 260 and the second propeller 262.

Co-rotating propellers may provide an advantage to single rotor propellers because they can produce less noise. Noise produced by propellers varies as an exponent of the tip speed of a propeller, thus, in order to reduce noise produced by a single rotor propeller, the aircraft speed is also reduced. A stacked propeller design also allows for flexibility of angles between the propellers which can be varied during different stages of flight functioning to increase the efficiency of the system. The speed and phase angle can be adjusted for each propeller on a stacked propeller, allowing for a more flexible and adaptable system. The stacked propellers can be stored during modes of operation where they are not necessary in order to reduce drag and improve efficiency.

The configuration of a stacked propeller can vary depending on the embodiment and requirements of the aircraft system and/or operation mode. In one embodiment, each co-rotating propeller (e.g., the first propeller 260, the second propeller 262) has the same blade shape and profile while in other embodiments, the first propeller 260 and the second propeller 262 have different dimensions and an offset phase of rotation. For example, the first propeller 260 and the second propeller 262 may have different camber and twist such that, when the propellers are azimuthally separated, a stacked propeller (e.g., starboard stacked propeller 115a, port stacked propeller 115b, front stacked propeller 140a, rear stacked propeller 140b) is able to achieve optimal camber between the two surfaces. For example, in one embodiment, the diameter of the second propeller 262 is approximately 95% of the diameter of the first propeller 260.

In relation to material composition, a stacked propeller (e.g., starboard stacked propeller 115a, port stacked propeller 115b, front stacked propeller 140a, rear stacked propeller 140b) can be made from of a single material or can be a composite material able to provide suitable physical properties for providing lift to the aircraft. The first propeller 260 and the second propeller 262 can be made from the same material or different materials. For example, the first propeller 260 and the second propeller 262 can be made from aluminum, or the first propeller 260 can be made from steel and the second propeller 262 can be made from titanium. The blade hub 268 can be made from the same or different material than the first propeller 260 and the second propeller 262. Alternatively, the components of the system (e.g., the first propeller 260, the second propeller 262, the blade hub 268) can be made from a metal, polymer, composite, or any combination of materials. The stacked propeller may also be exposed to extreme environmental conditions, such as wind, rain, hail, and/or extremely high or low temperatures. Thus, the material of the stacked propeller can be compatible with a variety of external conditions.

In relation to mechanical properties, the material of the first propeller 260 and the second propeller 262 can have a compressive strength, a shear strength, a tensile strength, a strength in bending, an elastic modulus, a hardness, a derivative of the above mechanical properties and/or other properties that enable the propeller to provide vertical lift to the aircraft. The first propeller 260 and the second propeller 262 may experience extreme forces during operation including thrust bending, centrifugal and aerodynamic twisting, torque bending and vibrations. The material of the first propeller 260 and the second propeller 262 can have a strength and rigidity that allows the propellers to retain their shape under forces exerted on the propellers during various modes of operation. In one embodiment, the first propeller 260 and/or the second propeller 262 are composed of a rigid composite. Additionally, the edges or tips of the blades 269 can be lined with a metal to increase strength and rigidity.

In one embodiment or during a certain mode of operation, the first propeller 260 and the second propeller 262 may co-rotate in a counter clockwise direction. In a different mode of operation, the first propeller 260 and the second propeller 262 can co-rotate in a clockwise direction. In the embodiment of FIG. 1, the stacked propellers (e.g., the starboard stacked propeller 115a, the port stacked propeller 115b) along the aircraft can rotate in opposite directions based on the mode of operation. For example, the starboard stacked propeller 115a can rotate in a clockwise direction and the port stacked propeller 115b can rotate in a counter clockwise direction. The stacked propellers (e.g., the front stacked propeller 140a, the rear stacked propeller 140b) can also rotate in the same or opposite directions. For example, the front stacked propeller 140a and the rear stacked propeller 140b can both rotate in a clockwise direction during a mode of operation. The rotational direction of a stacked propeller may depend on the mode of operation. According to the embodiment in FIG. 1, the stacked propellers (e.g., starboard stacked propeller 115a, port stacked propeller 115b, front stacked propeller 140a, rear stacked propeller 140b) have a diameter of approximately 6 to 10 feet. Alternatively, the stacked propellers can have any suitable dimensions. The stacked tail propellers (e.g. front stacked propeller 140a, rear stacked propeller 140b) can operate in addition to or instead of the starboard stacked propeller 115a and stacked port propeller 115b. The above description is not exclusive of the possible combinations of directions of rotation for each stacked propeller. The examples are used for illustration purposes.

Figure 3:
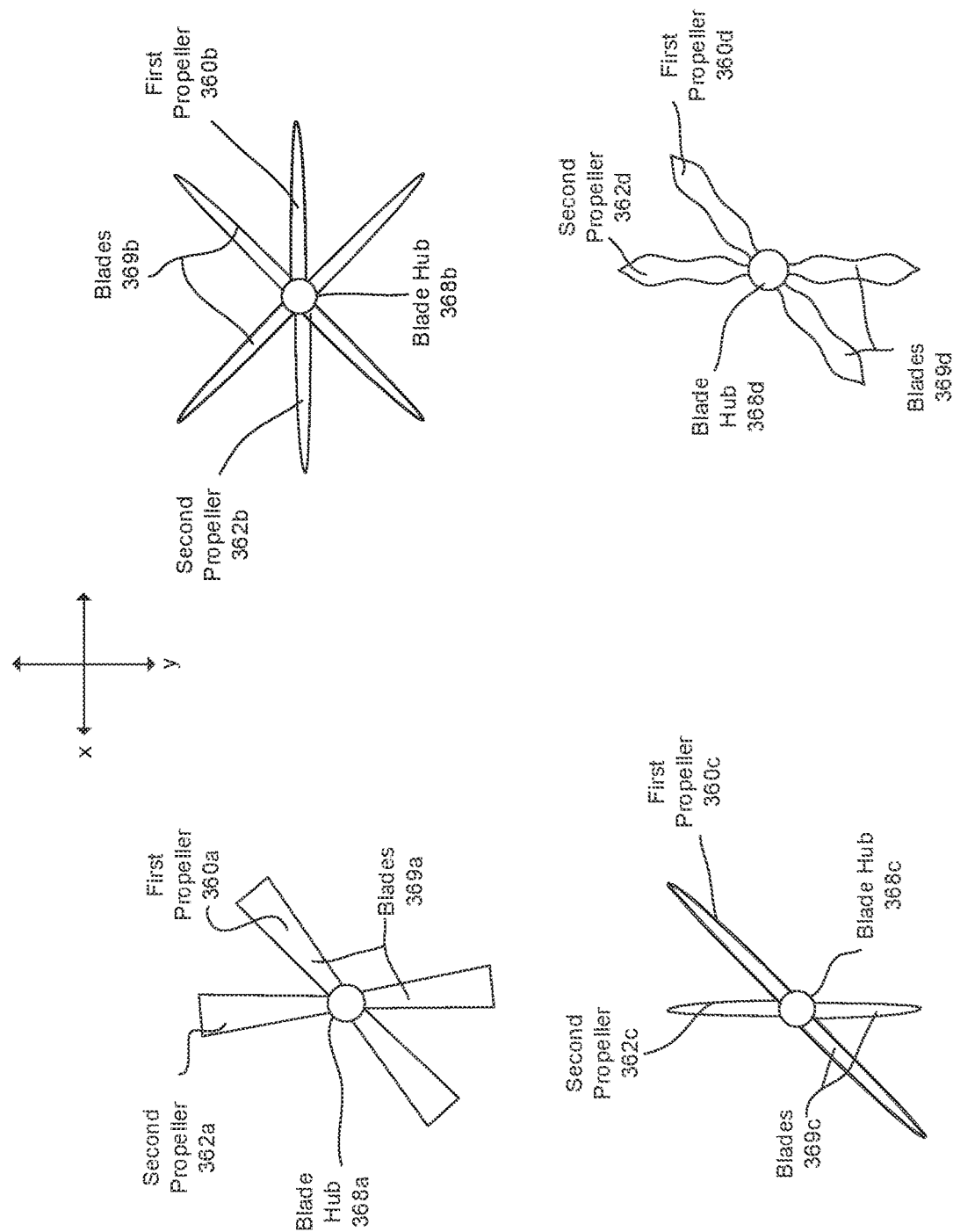
FIG. 3 illustrates various configurations of a stacked propeller, in accordance with several embodiments.

FIG. 3 illustrates a first embodiment (top left), a second embodiment (top right), a third embodiment (bottom left), and a fourth embodiment (bottom right), of a stacked propeller. A first embodiment (top left) shows a top view of a stacked propeller including a first propeller 360a and a second propeller 362a with angular blades 369a. The first propeller 360a and the second propeller 362a each includes two blades 369a. The width of the blades 369a is narrower at the blade hub 368a than at the free end of the blades 369a. A second embodiment (top right) of FIG. 3 includes a first propeller 360b with three blades 369b and a second propeller 362b with three blades 369b. The blades 369b are wider at the blade hub 368b than at the free ends of the blades 369b. The free ends of the blades 369b are round. A third embodiment (bottom left) of FIG. 3 shows a schematic including a first propeller 360b and a second propeller 362b each including two blades 369b coupled to a blade hub 368c. The blades 369b of the propellers are wider at the blade hub 368c than at the free end. The diameter of the second propeller 362c is smaller than the diameter of the first propeller 360c. A fourth embodiment (bottom right) of FIG. 3 includes a propeller with a first propeller 360d and a second propeller 362d, each including two blades 369d coupled to a blade hub 368d. The blades 369d are curved along the length from the blade hub 368d to the free end of the blades 369d.

FIG. 3 shows several embodiments and combinations of embodiments of a stacked propeller. Alternatively, a stacked propeller can have different characteristics (e.g., shape, orientation, size) and different combination of embodiments to satisfy the design constraints (e.g., load capacity, manufacturing limitations) of an aircraft. The stacked propeller (e.g., starboard stacked propeller 115a, port stacked propeller 115b, front stacked propeller 140a, rear stacked propeller 140b) can also have a different number of propellers each with a different number of blades to improve aircraft efficiency or reduce noise. In one embodiment, a stacked propeller includes a different blade pitch and different twist distributions on each set of blades. A first propeller (e.g., a top propeller) may have a lower pitch to induce an airflow, while a second propeller (e.g, a propeller below a top propeller) can have a higher pitch to accelerate the airflow. The twist distribution can be configured to stabilize an interaction of a tip vortex (e.g., vortex produced by the tip speed of the upper blade) with a lower blade in order to produce optimal thrust.

Figure 4D:
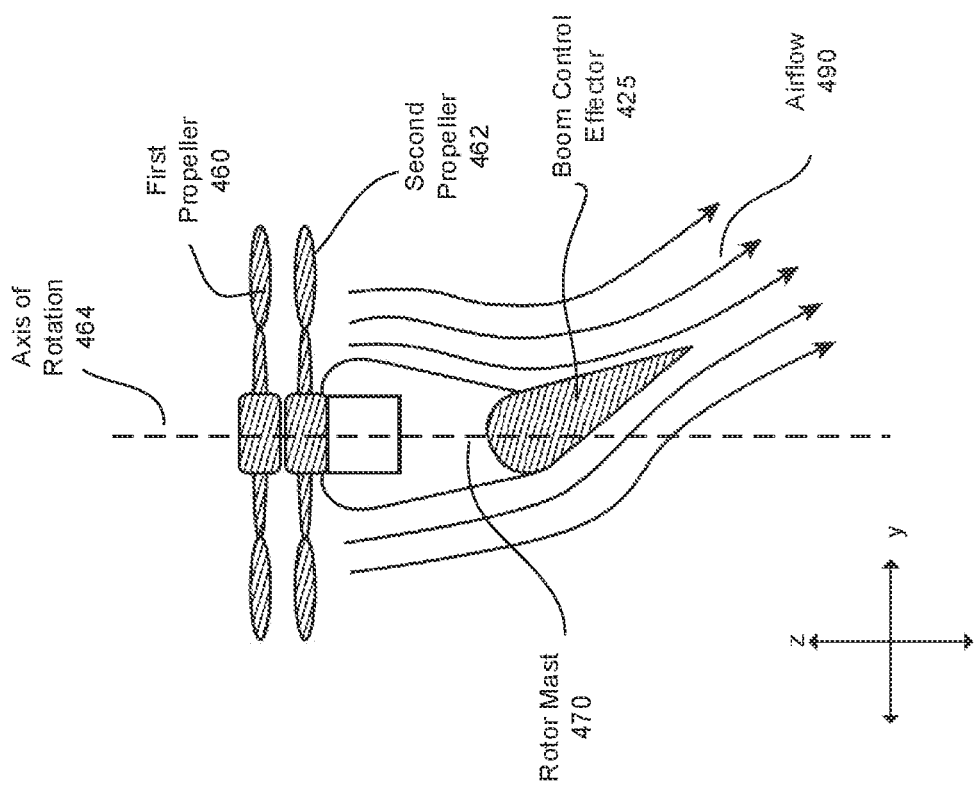
FIG. 4D illustrates a configuration of a stacked propeller during a fourth mode of operation, in accordance with one or more embodiments.

FIG. 4A shows a side view of one embodiment of a stacked propeller in one mode of operation and FIG. 4B shows a side view of an embodiment of a stacked propeller in a different mode of operation. The stacked propeller shown in FIGS. 4A-4D is substantially similar to the stacked propeller shown in FIGS. 2A-2B. The schematic includes a first propeller 460, a second propeller 462, a blade hub 468, blades 469, a rotor mast 470, and an internal cavity 472. FIG. 4A shows a schematic where the first propeller 460 and the second propeller 462 are coupled to a rotor mast 470. The rotor mast 470 includes an internal cavity 472. In one embodiment, the rotor mast 470 is a boom (e.g. wing boom 120, tail boom 145). In alternative embodiments, the rotor mast 470 can be a nacelle (e.g, nacelle 112). A boom and/or a nacelle can be configured to have a surface profile that matches the blade profile of the first propeller 460. This enables a conformal surface fit between the first propeller 260 and the rotor mast 470 to minimize drag and flow separation. In one operation mode shown by FIG. 4B, the blades 469 of the first propeller 460 and the second propeller 462 can be recessed within the internal cavity 472 of the rotor mast 470 in order to reduce drag. The first propeller 460 and/or the second propeller 462 can be recessed at one time in order to cooperate with a mode of operation, described in greater detail in relation to FIG. 5-11 below.

1.6 Boom Control Effectors

An aircraft can include a boom attached to a region of the aircraft. In one embodiment, such as illustrated in FIG. 1, a boom is attached to each wing of an aircraft 100 and/or the tail of an aircraft 100. In general, booms contain ancillary items such as fuel tanks. They can also be used for providing structural support to an aircraft. In one embodiment, a boom can include boom control effectors that facilitate different modes of operation of an aircraft.

In the embodiment of FIG. 1, a propeller (e.g., starboard stacked propeller 115a, front stacked propeller 140a) can be coupled to a boom (e.g., wing boom 120, tail boom 145) to provide lift to an aircraft during takeoff and landing. Shown in FIG. 1, a starboard stacked propeller 115a is attached to a starboard side wing boom 120 and a port stacked propeller 115b is attached to a port side wing boom 120. A front stacked propeller 140a and a rear stacked propeller 140b are attached to a tail boom 145. In alternative embodiments, a single rotor propeller (e.g., a cruise propeller 110) can be attached to a boom.

The booms (e.g., wing boom 120, tail boom 145) can be hollow and can be used to store aircraft components useful for operation. For instance, a boom can include electric motors and batteries to power a propeller (e.g., starboard stacked propeller 115a, port stacked propeller 115b) or other aircraft components. In one embodiment, a battery is located at the bottom of the wing boom 120 and can span the length of the boom 120. In other embodiments, a battery can be located at either end of a wing boom 120 or a tail boom 145 to function as a counterweight to help maintain the balance and alignment of aircraft 100. The battery can also be placed in a location in the wing boom 120 or the tail boom 145 to minimize aero elastic and whirl flutter resonance during a mode of operation. A battery can also be included in another position along the aircraft 100. A battery door can be located on the bottom of the wing boom 120 to allow for removal of the battery powering a propeller (e.g., starboard stacked propeller 115a, port stacked propeller 115b) or another aircraft component.

In an embodiment where the wing boom 120 and/or the tail boom 145 are hollow, the boom can be used as a resonator to alter the noise signature of the aircraft 100 during one or more modes of operation. A Helmholtz resonator is a container of gas, such as air, with an open hole. A resonator can be tuned to the frequency of a propeller such that the noise resulting from the airflow over a propeller coupled to the boom (e.g. wing boom 120, tail boom 145) is reduced. Sound produced as a result of pressure fluctuations generated by a propeller can be modified by the presence of a tuned volume inside a boom. Tuning the volume can permit acoustic and aerodynamic modification such that the radiated sound emitted by a propeller coupled to a boom is reduced. In one embodiment, a boom (a wing boom 120, a tail boom 145) has an appropriate volume of air relative to the size of a propeller to act as a resonator. In a mode of operation, when the stacked propellers are deployed (e.g., takeoff), an internal cavity 472, as described below in relation to FIG. 4A, can function as the entrance for airflow into the resonator. A portion of the air flow over the stacked propeller can flow into the boom (e.g., wing boom 120, tail boom 145) via the internal cavity 472 and the frequency can be tuned to reduce the noise produced by the propeller. In one embodiment, a boom control effector 425 can operate in conjunction with a boom (e.g., wing boom 120, tail boom 145) operating as a resonator to reduce noise. The rotation frequency, described in greater detail below, of the boom control effector can be configured to tune with the frequency of the resonator such that noise is further mitigated.

When the aircraft 100 is in a vertical takeoff and landing configuration, the propellers (e.g., starboard stacked propeller 115a, port stacked propeller 115b) blow air past the wing booms 120 and the tail boom 145 to produce lift. A cross sectional view of an embodiment of a boom (e.g., a tail boom 145, a wing boom 120) is shown by FIGS. 4A-4D. FIGS. 4A-4D demonstrate the flow of air over the boom during different modes of operation. The boom can include a boom control effector 425 configured to rotate about an axis perpendicular to an axis of rotation 464. A boom control effector can be a single effector as described by FIGS. 4A-4D or a split effector. A split effector may operate in conjunction with a boom that operates as a resonator to reduce noise produced by the propeller. The split effector can include two boom control effectors attached to a single rotor mast 470.

In one embodiment, a boom can include a rotor mast 470 coupled to a boom control effector 425. A boom control effector 425 can be configured to direct the airflow from a propeller. FIG. 4A illustrates the boom control effector 425 during a mode of operation, such as a vertical takeoff configuration, as described in greater detail below. The boom control effector 425 is in a neutral position in FIG. 4A. An airflow 490 below the propellers (e.g., first propeller 460, second propeller 462) is not separated from the surface of the boom. FIG. 4B illustrates a mode of operation, such as a cruise configuration, where the propellers (e.g., first propeller 460, second propeller 462) are recessed within the internal cavity 472. When the propellers (e.g., first propeller 460, second propeller 462) are recessed within the cavity 472, the boom control effector 425 may not be in operation (e.g., the boom control effector remains in a neutral position).

Figure 4C:
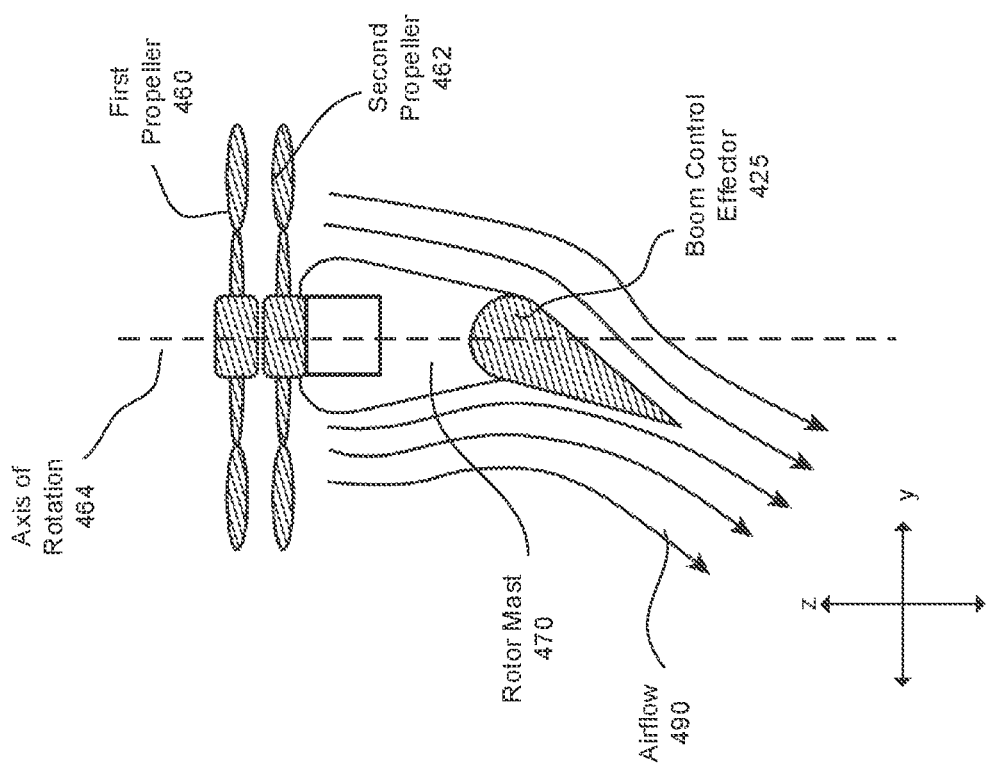
FIG. 4C illustrates a configuration of a stacked propeller during a third mode of operation, in accordance with one or more embodiments.

FIGS. 4C-4D illustrate two other modes of operation of a boom control effector, according to an embodiment. FIGS. 4C-4D show a boom control effector 425 rotated about an axis perpendicular to an axis of rotation 464 (e.g, an axis extending from the page). The angle of the boom control effector 425 directs the downstream airflow 490 in a direction offset from an axis parallel to the z-axis (i.e. to the left or right) of the boom during various modes of operation, as described in greater detail below in relation to FIGS. 5-11. The angle of the boom control effector 425 can be manually controlled or automated during different modes of operation. The angle can be held constant during a mode of operation or may change based on environmental conditions. Alternatively, the boom control effector 425 can be configured to continuously oscillate about an axis perpendicular to the axis of rotation 464. The oscillation frequency can be tuned to align with the frequency of a boom that functions as a resonator, as described above. In alternative embodiments, the boom control effector 425 can be configured to direct the airflow 490 in another direction. The movement of the boom control effector 425 is configured to control the cross wind of the propeller and mitigate the acoustic signature of the propeller. The boom control effector 425 can control the direction of the airflow 490, which may result in a significant reduction in noise produced by the propeller. It may also allow for enhanced yaw control of an aircraft. The boom control effector 425 can also improve efficiency and reduce power consumed by the aircraft 100 by realigning the airflow.

In FIGS. 4A-4D, the boom control effector 425 has a teardrop shape. In other embodiments, the boom control effector 425 can have another shape suitable for mitigating noise and directing airflow. For instance, the boom control effector 425 can have a split configuration such that during a mode of operation, the boom control effector 425 has multiple longitudinal surfaces that can control airflow direction. The split configuration can be configured to allow the boom to act as a resonator, as described above. In one embodiment, boom control effector 425 and a corresponding boom (e.g., tail boom 145, wing boom 120) have a non-circular cross section to reduce undesired effects (e.g., aeroelastic and whirl flutter) of aerodynamic forces on the aircraft 100. The boom control effector 425 can also have a rectangular end region coupled to the rotor mast 470 and a pointed or rounded free end region. The shape of the boom control effector 425 depends on design considerations (e.g., size of the propellers, location of the propellers, aircraft load capacity, etc.) of the aircraft.

Figure 4E:
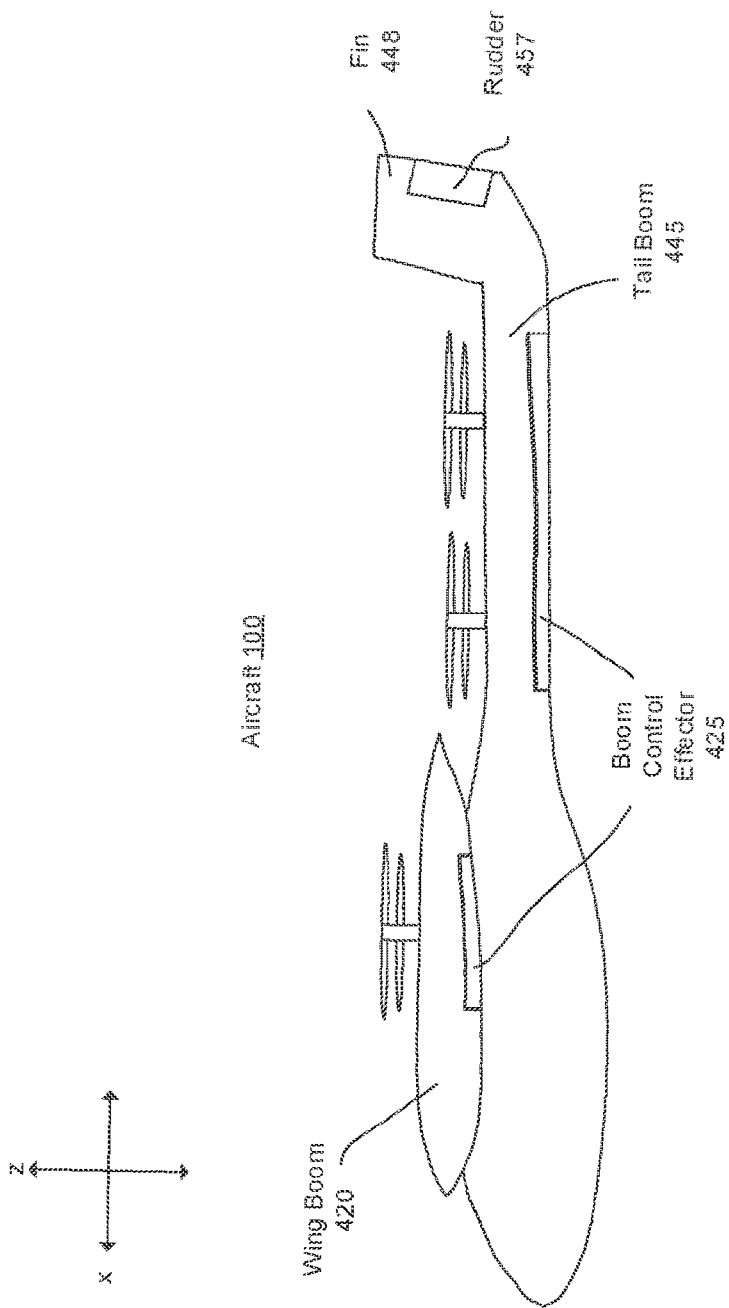
FIG. 4E illustrates a side view of an aircraft with boom control effectors, in accordance with one or more embodiments.

A side view of the aircraft 100 including a wing boom and a tail boom are shown in FIG. 4E. The side view illustrates a boom control effector 425 coupled to a portion of a wing boom 420. The boom control effector 425 extends along the longitudinal surface of the wing boom 420 and is positioned below a propeller. In one embodiment, the diameter of the propeller is approximately equal to the length of the boom control effector 425. In alternative embodiments, the diameter of the propeller can be larger or smaller than the length of the boom control effector 425. The internal cavity 472 described above can have a length similar to the length of the boom control effector 425. An aircraft tail boom 445 is also shown in FIG. 4E, according to an embodiment. The aircraft tail boom 445 includes a boom control effector 425 that spans the length of the tail boom. Two sets of propellers are coupled to the tail boom 445. The length of the tail boom control effector 425 is approximately equal to the combined diameter of the tail propellers (e.g., front stacked propeller 140a, rear stacked propeller 140b). In alternative embodiments, the length of the boom control effector 425 can be smaller or larger than the total diameter of the propellers. The internal cavity 472 described above can have a length similar to the length of the tail boom control effector 425.

In relation to material composition, boom control effector 425 can be made from of a single material or can be a composite material able to provide suitable physical properties for controlling the direction of airflow behind a propeller. The boom control effector 425 can be made from the same material or a different material than the rotor mast 470. The boom control effector 425 may also be exposed to extreme environmental conditions, such as wind, rain, hail, and/or extremely high or low temperatures. Thus, the material of the boom control effector 425 can be compatible with a variety of external conditions.

In relation to mechanical properties, the material of the boom control effector 425 can have a compressive strength, a shear strength, a tensile strength, a strength in bending, an elastic modulus, a hardness, a derivative of the above mechanical properties and/or other properties that enable the boom control effector 425 to direct the airflow 490 behind or below a propeller. The boom control effector 425 may experience extreme forces during operation including thrust bending, centrifugal and aerodynamic twisting, torque bending and vibrations. The material of the boom control effector 425 can have a strength that allows the boom control effector 425 to retain its shape under forces exerted on the boom control effector 425 during various modes of operation.

As described above, a boom control effector (e.g., 425) can be included in a VTOL aircraft 100. A boom control effector 425 can be configured to direct airflow behind or below a propeller included in aircraft 100. In alternative embodiments, a boom control effector can be included in any aircraft that includes rotors or propellers, such as a helicopter.

1.7 Modes of Operation

An aircraft mission profile 000 shown in FIGS. 5-11 illustrates the approximate trajectory of the VTOL aircraft 100 from stage 001-007. The aircraft and its components shown in FIGS. 5-11 are substantially the same as the aircraft 100 and the corresponding components shown in FIG. 1 (e.g., cruise propellers 510 are substantially the same as cruise propellers 110). During each stage, components of the aircraft 100 are adjusted such that the center of gravity, center of thrust, and aerodynamic center can be approximately aligned. The components of the aircraft 100 can be adjusted to maximize lift and thrust and reduce noise resulting from airflow over propellers. The adjustable components include stacked propellers, control surfaces, boom control effectors, and cruise propellers. In alternative embodiments, the aircraft 100 can include fewer or more adjustable components for aligning the center of gravity, center of thrust, and aerodynamic center during stages 001-007 of aircraft 100 operation.

Figure 5:
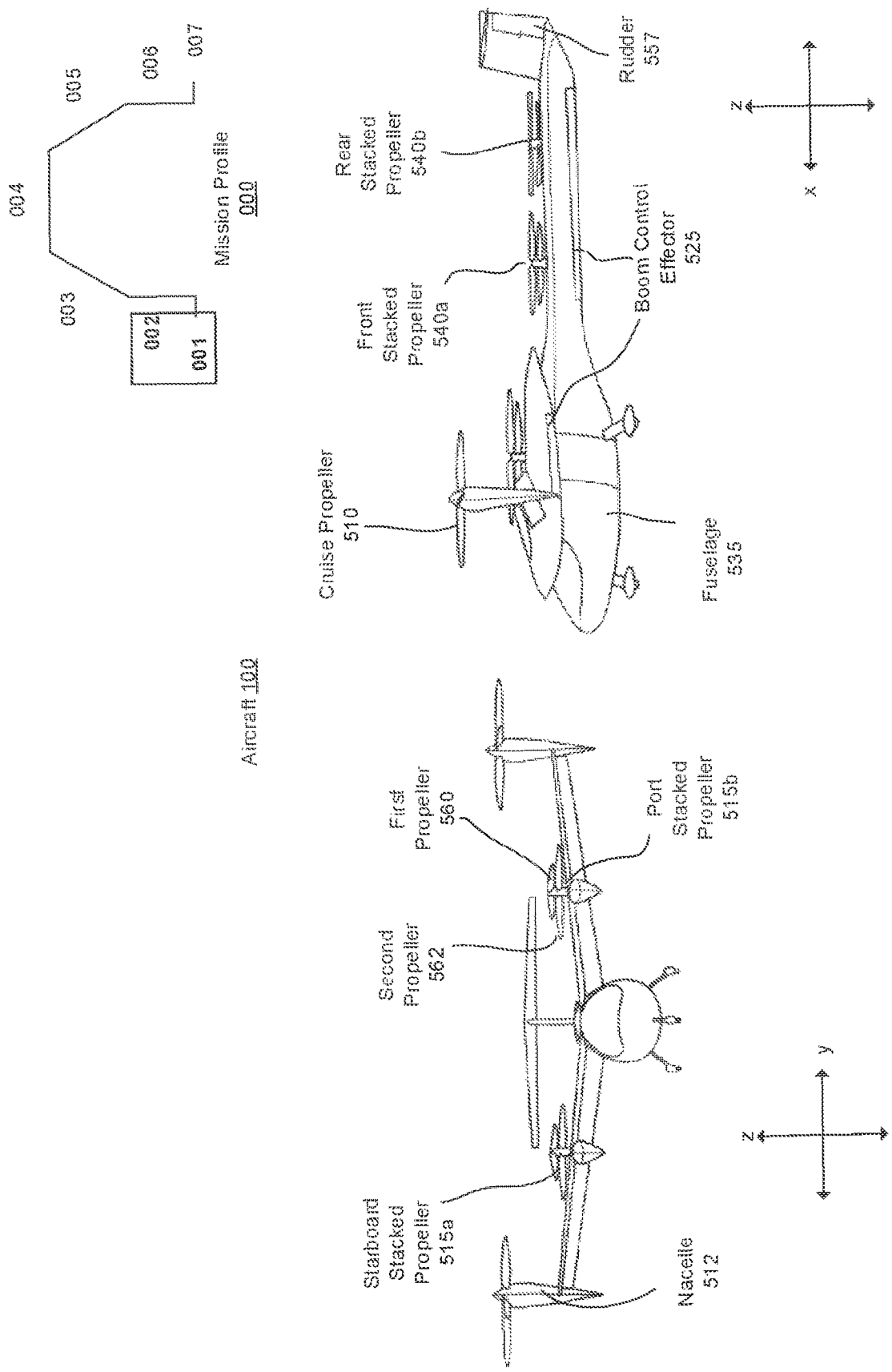
FIG. 5 illustrates a climb configuration of a VTOL aircraft, in accordance with the embodiment of FIG. 1.

FIG. 5 illustrates a taxiing and climb configuration of a VTOL aircraft 100, in accordance with an embodiment. Stage 001 corresponds to the parked and taxiing position of the aircraft 100, and stage 002 corresponds to the climb (e.g., vertical takeoff) configuration of the aircraft. While the aircraft 100 is parked (e.g., when passengers are entering or exiting the aircraft 100), the stacked propellers (e.g., front stacked propeller 540a, rear stacked propeller 540b) can be stationary, and the wingtip nacelles 512 can be pitched upward such that they are perpendicular to the fuselage 535. The aircraft 100 may include one or more stacked propellers (e.g., starboard stacked propeller 515a, port stacked propeller 515b, front stacked propeller 540a, rear stacked propeller 540b) located along the aircraft, illustrated by FIG. 5. Each stacked propeller has a first propeller 560 and a second propeller 562 that can rotate about a central axis of rotation. The propellers (e.g., starboard stacked propeller 515a, port stacked propeller 515b, front stacked propeller 540a, rear stacked propeller 540b) may also be retracted into a cavity within the aircraft 100 while the aircraft is stationary or taxiing. The wing control surfaces 130, tail control surfaces 160, described in relation to FIG. 1, remain in a neutral position during parking for passenger safety. The rudder 557 can also remain in a neutral position.

When the aircraft 100 is ready for takeoff, the stacked propellers (e.g., starboard stacked propeller 515a, port stacked propeller 515b, front stacked propeller 540a, rear stacked propeller 540b) can rotate and increase in rotational speed until the aircraft 100 lifts off the ground. During takeoff, stage 002, the nacelles 512 remain at an approximately 90-degree vertical angle to the fuselage 535 to enable the cruise propellers 510 to provide vertical lift. In one embodiment, the port stacked propeller 515b, and the rear stacked propeller 540b rotate in a clockwise direction while the starboard stacked propeller 515a, and the front stacked propeller 540a rotate in a counterclockwise direction during climb.

As the propellers (e.g., starboard stacked propeller 515a, front stacked propeller 540a) rotate, the boom control effectors 525 may remain in a neutral position. Alternatively, the boom control effectors 525 may be angled to yaw the vehicle and guide airflow in a direction to stabilize or otherwise direct the aircraft 100. In most aircrafts, yaw motion is controlled by the rudder 657 of an aircraft. In one embodiment, the yaw motion is controlled partially or in full by the boom control effectors 525. The yaw motion can also be controlled by a 5-10 degree angle of a rudder 557 located on the tail of the aircraft 100. Both surfaces may be angled such that the aircraft maintains a level position during takeoff (e.g., the center of gravity, center of thrust, and aerodynamic center are approximately aligned). The wing control surfaces 130 can lower 40 degrees and the tail control surfaces 160 can lower to approximately 5 to 10 degrees to control aircraft pitch.

Figure 6:
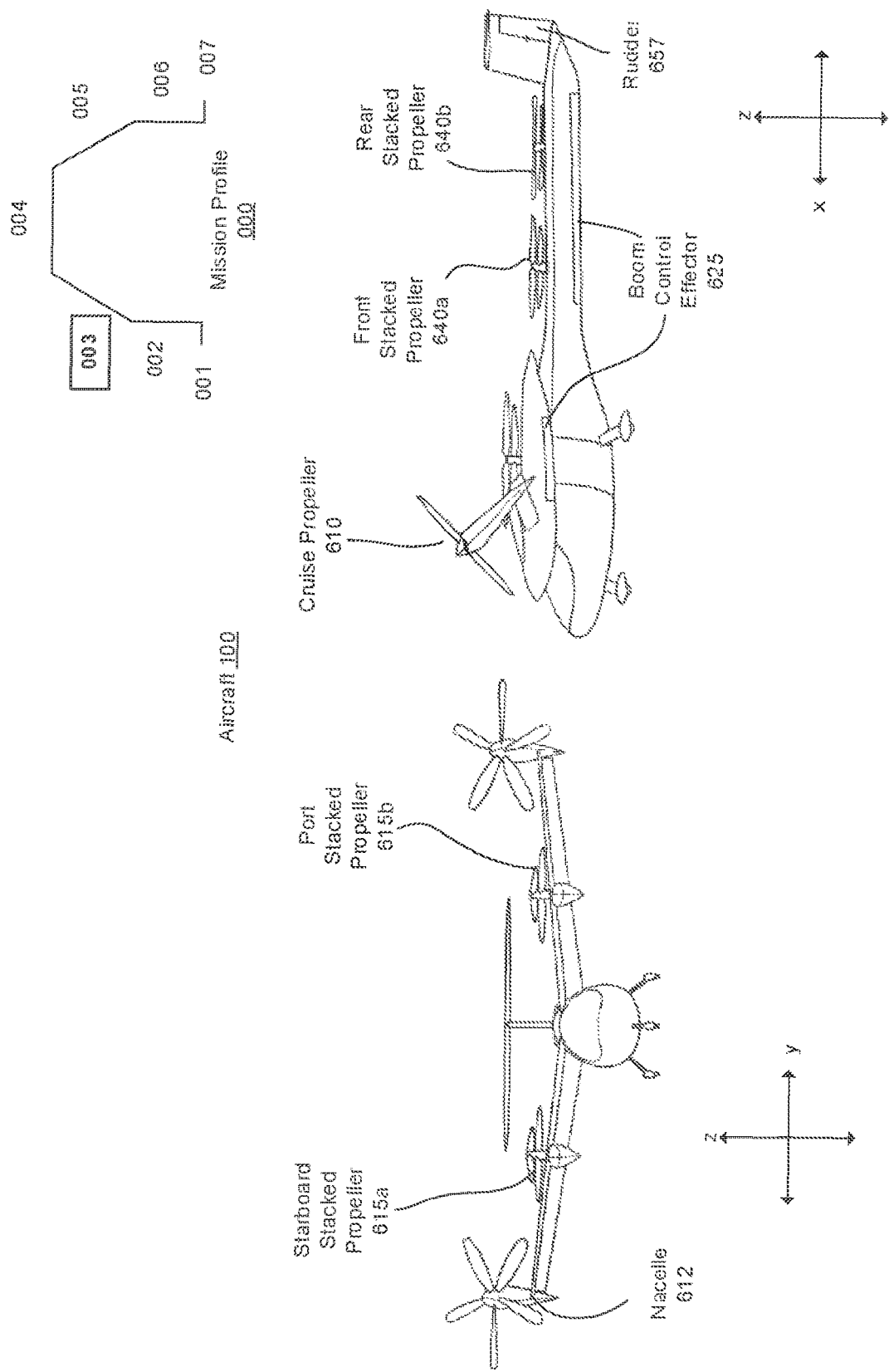
FIG. 6 illustrates an early egress transition configuration of a VTOL aircraft, in accordance with the embodiment of FIG. 1.

FIG. 6 illustrates an early egress transition configuration of a VTOL aircraft 100, in accordance with one or more embodiments. The egress transition period, stage 003, converts an aircraft from its climb state to its cruise state. As the aircraft 100 approaches cruising altitude, it begins to transition to a cruise configuration from the vertical takeoff mode, stage 002. At the beginning of this transition, the nacelles 612 and cruise propellers 610 start to transition downward. Midway through the rotation, the stacked wing propellers (e.g., starboard stacked propeller 615a, port stacked propeller 615b, front stacked propeller 640a, rear stacked propeller 640b) begin to slow but can remain in the upward position before transitioning to the late egress mode of operation. The wing control surfaces 130 remain at a 40 degree pitch and the tail control surfaces 160 can return to a neutral position.

FIG. 7A illustrates a late egress transition configuration of a VTOL aircraft 100, in accordance with an embodiment. The aircraft 100 approaches the end of the egress transition, stage 003, as the nacelles 712 and cruise propellers 710 continue to rotate downward until the nacelles 712 are approximately parallel to the fuselage 735. The stacked propellers (e.g., starboard stacked propeller 715a, port stacked propeller 715b, front stacked propeller 740a, rear stacked propeller 740b) can continue to slow their rotation and the first propeller and second propeller of each stacked propeller may rotate at the same speed. The wing control surfaces 130 deflect to a neutral position and the tail control surfaces 160 remain in a neutral position. During the early egress and late egress transition configuration of a VTOL aircraft 100, the boom control effectors (e.g., 625, 725) and the rudder (e.g., 657, 757) can be in a neutral position. Alternatively, the boom control effectors (e.g., 625, 725) and the rudder (e.g., 657, 757) can be angled to control yaw motion or to reduce noise, particularly in windy or otherwise harsh environmental conditions.

Figure 7C:
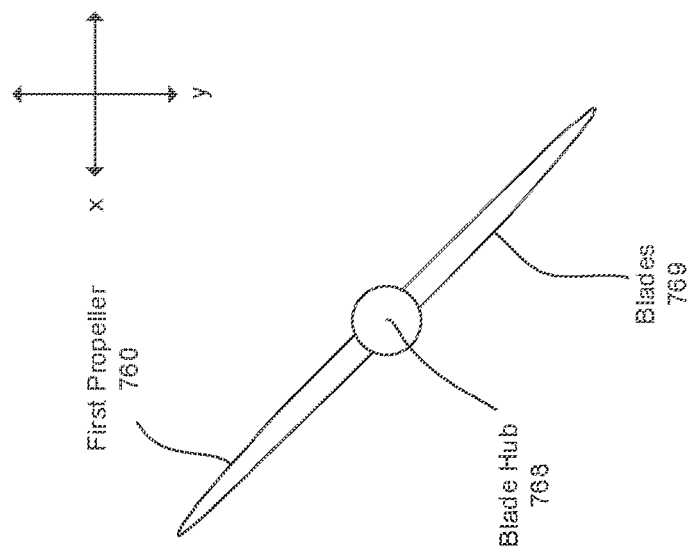
FIG. 7C illustrates a top view of a propeller configuration associated with one or more modes of operation, in an accordance with the embodiment of FIG. 7A.
Figure 7B:
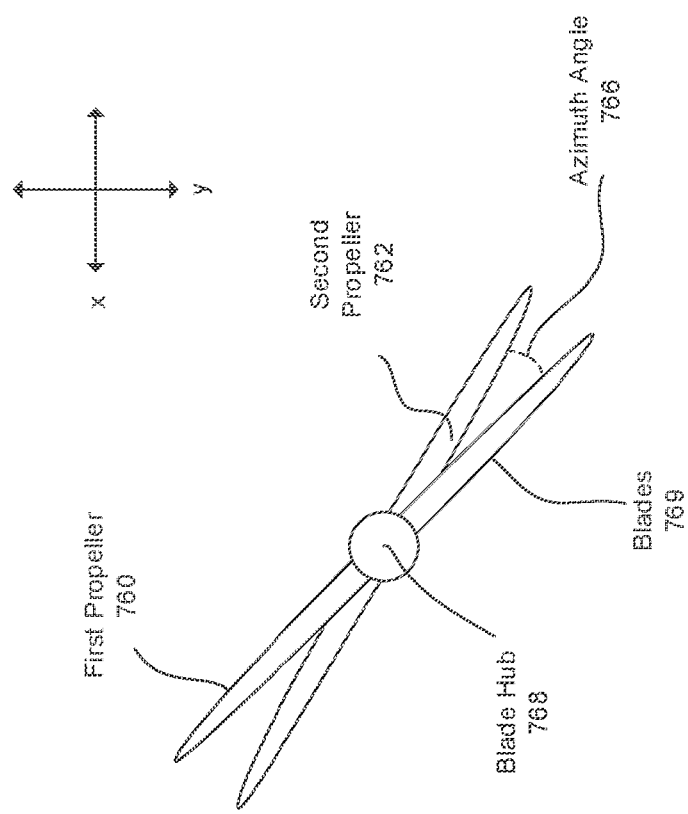
FIG. 7B illustrates a top view of a propeller configuration associated with one or more modes of operation, in an accordance with the embodiment of FIG. 7A.

FIG. 7B shows a top view of the blades 769 of a stacked propeller in late egress transition, according to an embodiment. In FIG. 7B, the first propeller 760 is ahead of the second propeller 762 by an azimuth angle 766. As the propeller transitions to cruise, the rotational speed of the propellers (e.g., first propeller 760, second propeller 762) can slow down such that the azimuth angle 766 is zero and the blades 769 are rotating at the same speed, shown in the top view of FIG. 7C. The propellers can stop rotating before being retracted into an internal cavity of a rotor mast.

Figure 8:
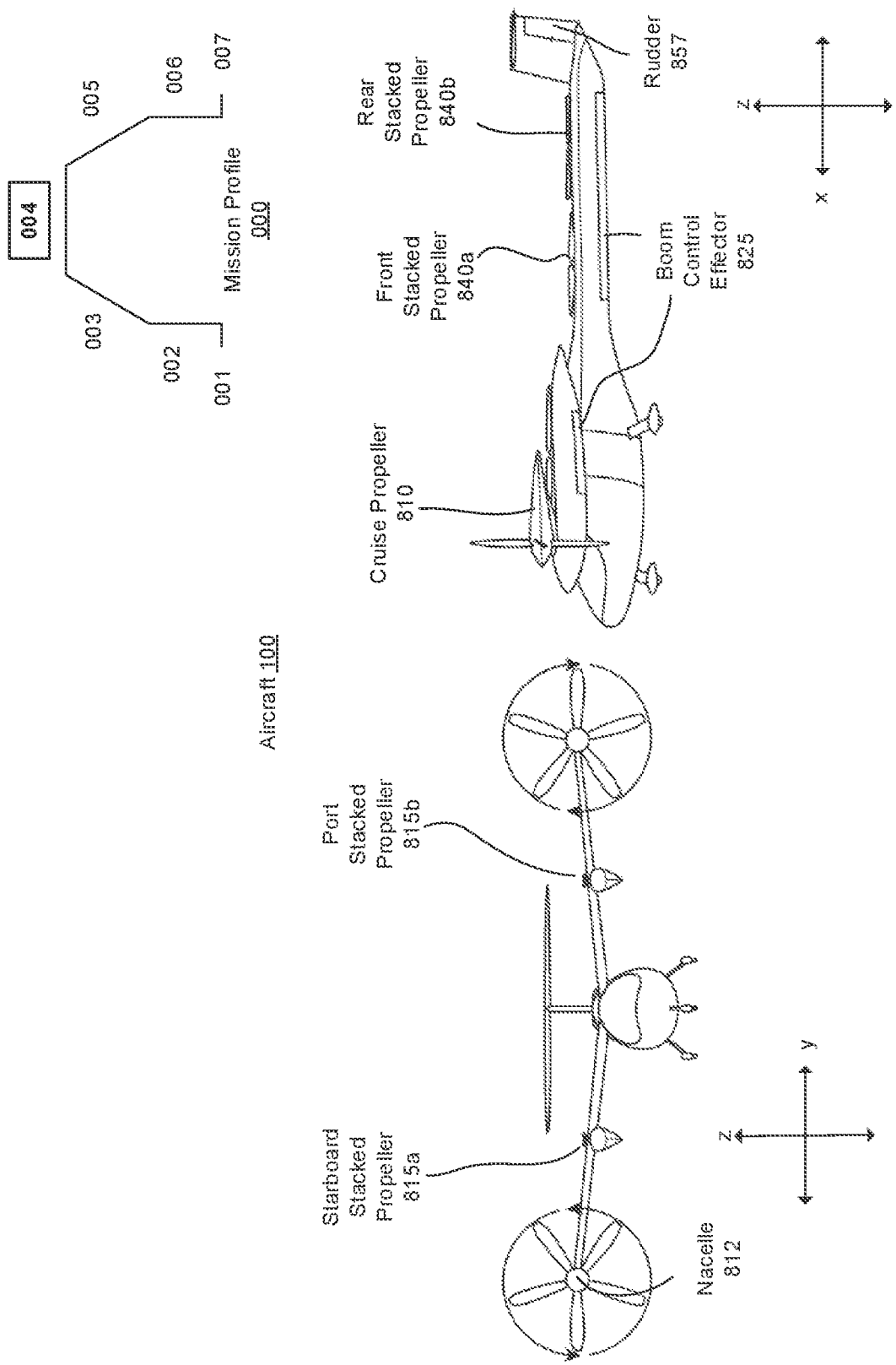
FIG. 8 illustrates a cruise configuration of a VTOL aircraft, in accordance with the embodiment of FIG. 1.

FIG. 8 illustrates a cruise configuration of a VTOL aircraft 100, in accordance with an embodiment. The cruise configuration, stage 004, is generally characterized by a steady, level flight. The wing control surfaces 130 and the tail control surfaces 160 remain in a neutral position. During cruise, the nacelles 812 remain parallel to the fuselage 835, allowing the cruise propellers 810 to propel the aircraft 100 at a cruising velocity (e.g., approximately 170 miles per hour). In one embodiment, the port cruise propeller 810 rotates in a clockwise direction, and the starboard cruise propeller 810 rotates in a counterclockwise direction. The stacked wing propellers (e.g., starboard stacked propeller 815a, port stacked propeller 815b) and stacked tail propellers (e.g., front stacked propeller 840a, rear stacked propeller 840b) may be stowed in an internal cavity of a rotor mast, as described above in relation to FIGS. 4A-4B, in order to reduce drag. When the propellers are stored, the aircraft 100 relies on the wings for propelling forward flight during cruise mode, stage 004. This is beneficial for the efficiency during forward level flight, because aircrafts with single rotors (e.g., helicopters) can be relatively inefficient during cruise compared to aircrafts with wings. In one embodiment, 35-40% of the total propeller area, including stacked propellers and cruise propellers, is active during forward flight. This may increase efficiency and avoid rotating or folding of the propellers. Alternatively, the first propeller (e.g., 260) and/or the second propeller (e.g., 262) of a stacked propeller (e.g., starboard stacked propeller 815a, port stacked propeller 815b, front stacked propeller 840a, rear stacked propeller 840b) can remain in its exposed position.

In the embodiment of FIG. 8, the boom control effectors 825 and the rudder 857 remain in a neutral position during a cruise configuration. In particular, the stacked propellers (e.g., port stacked propeller 815b, rear stacked propeller 840b) may not be rotating or may be recessed within a cavity such that a boom (e.g., a wing boom 120, a tail boom 145) can function for alternative purposes (e.g., storage). In a second embodiment, the boom control effectors 825 can be angled to control the airflow behind a propeller. For instance, a boom control effector 825 can be attached to a cruise propeller 810. The cruise propeller 810 can be configured to a boom control effector such that the boom control effector is the appropriate size and shape for directing an air stream tube behind the cruise propeller 810. During a mode of operation, a boom control effector 825 can direct air flow behind the cruise propeller 810 such that the aircraft 100 follows a designated flight path and the noise produced by the cruise propeller 810 is mitigated. In an embodiment where a boom control effector is attached to a cruise propeller 810, the air flow behind the propeller may flow in a direction parallel to the fuselage of the aircraft. In this embodiment, or another embodiment where the propeller is not a vertical propeller, the boom control effector may be configured to control pitch and/or roll motion.

Figure 9:
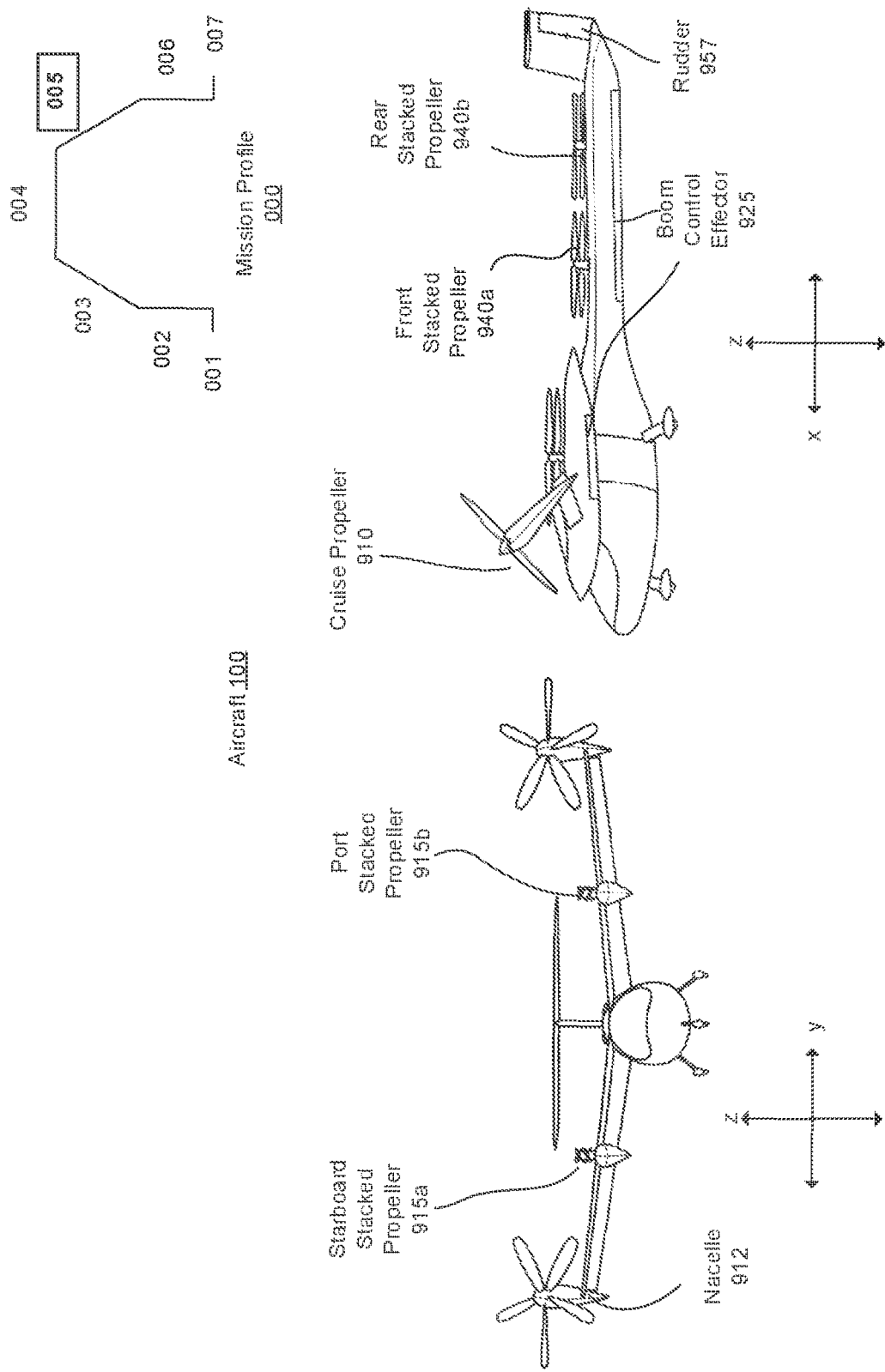
FIG. 9 illustrates an early ingress transition configuration of a VTOL aircraft, in accordance with the embodiment of FIG. 1.

FIG. 9 illustrates an early ingress transition configuration of a VTOL aircraft 100, in accordance with an embodiment. The early ingress transition, stage 005, converts the aircraft from a cruise stage 004 to a descent stage 006. As the aircraft 100 begins to transition from the cruise configuration to a vertical descent, the nacelles 912 and cruise propellers 910 start to transition upwards. The stacked wing propellers (e.g. starboard stacked propeller 915a, port stacked propeller 915b) and stacked tail propellers (e.g. front stacked propeller 940a, rear stacked propeller 940b) can redeploy from an internal cavity of a rotor mast, but may not begin rotating. The wing control surfaces 130 can deflect to a 40 degree angle and the tail control surfaces 160 remain in a neutral position.

Figure 10:
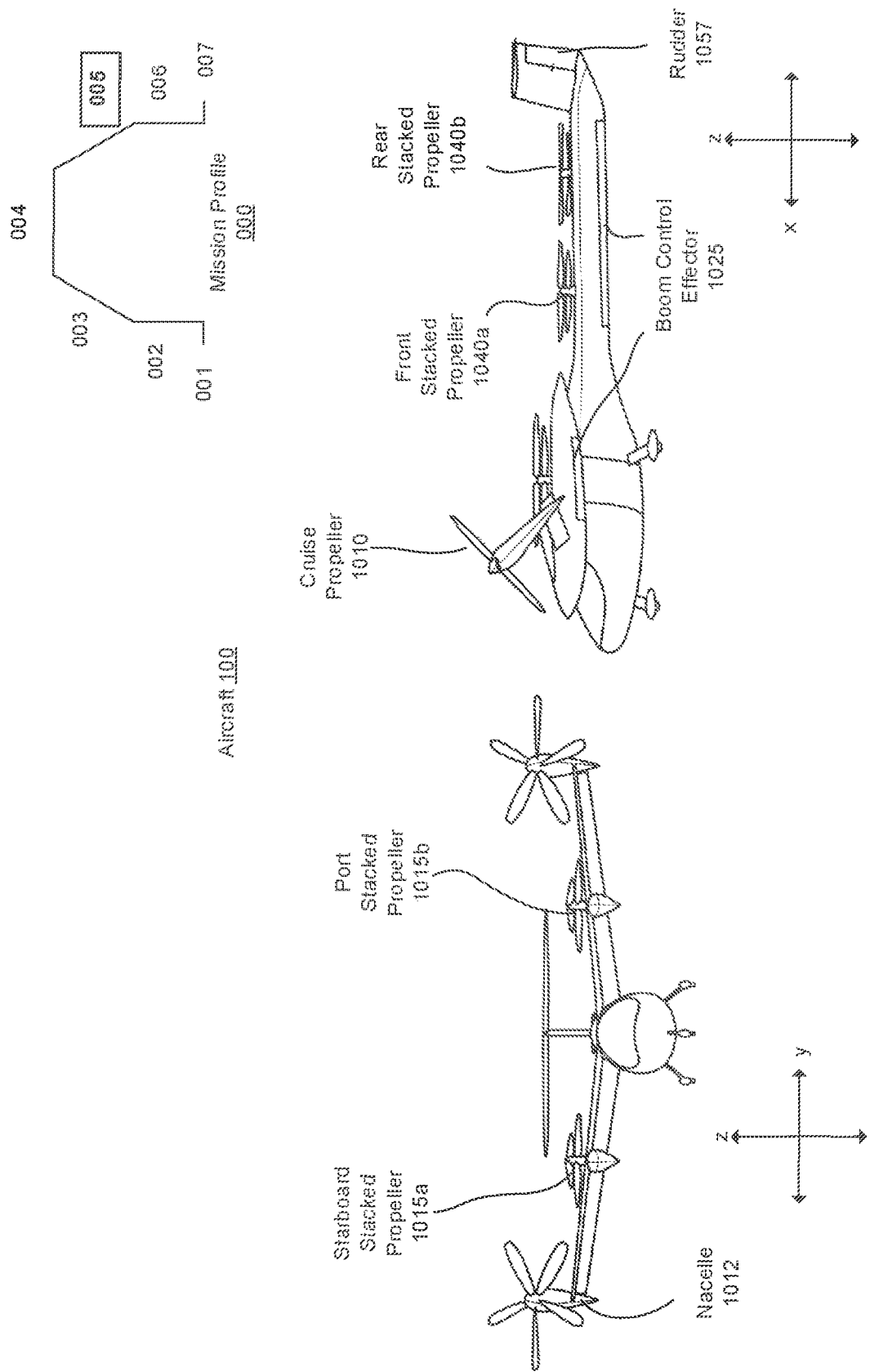
FIG. 10 illustrates a late ingress transition configuration of a VTOL aircraft, in accordance with the embodiment of FIG. 1.

FIG. 10 illustrates a late ingress transition configuration of a VTOL aircraft 100, in accordance with an embodiment. The aircraft 100 approaches the end of the transition, stage 005, as the nacelles 1012 and cruise propellers 1010 fully rotate such that the nacelles 1012 are perpendicular to the fuselage 135. The stacked wing propellers (e.g. starboard stacked propeller 1015a, port stacked propeller 1015b) and stacked tail propellers (e.g. front stacked propeller 1040a, rear stacked propeller 1040b) begin to rotate and increase in speed. The first propeller and the second propeller of each stacked propeller may rotate at the same or different speeds. In one embodiment, the stacked propellers rotate in opposite directions such that the port cruise propeller 1010, the port stacked propeller 1015b, and the rear stacked propeller 1040b rotate in a clockwise direction while the starboard cruise propeller 1010, the starboard stacked propeller 1015a, and the front stacked propeller 1040a rotate in a counterclockwise direction. The wing control surfaces 130 are pitched down to 40 degrees and the tail control surfaces 160 remain in a neutral position.

During the early ingress and late ingress transition of the aircraft (FIGS. 9-10), the boom control effectors (e.g. 925, 1025) may remain in a neutral position while the propellers are not rotating. In other embodiments, the boom control effectors (e.g. 925, 1025) can be tilted to control yaw movement and/or reduce noise if the propellers begin rotating. In one embodiment, the boom control effectors (e.g. 925, 1025) may have the same angle with respect to the axis of rotation. In other embodiments, the boom control effectors (e.g. 925, 1025) may have different angles for guiding the airflow from the propellers with respect to the axis of rotation for each propeller. The rudder (e.g., 957, 1057) attached to the tail of the aircraft can also remain in a neutral position during the ingress transition period.

Figure 11:
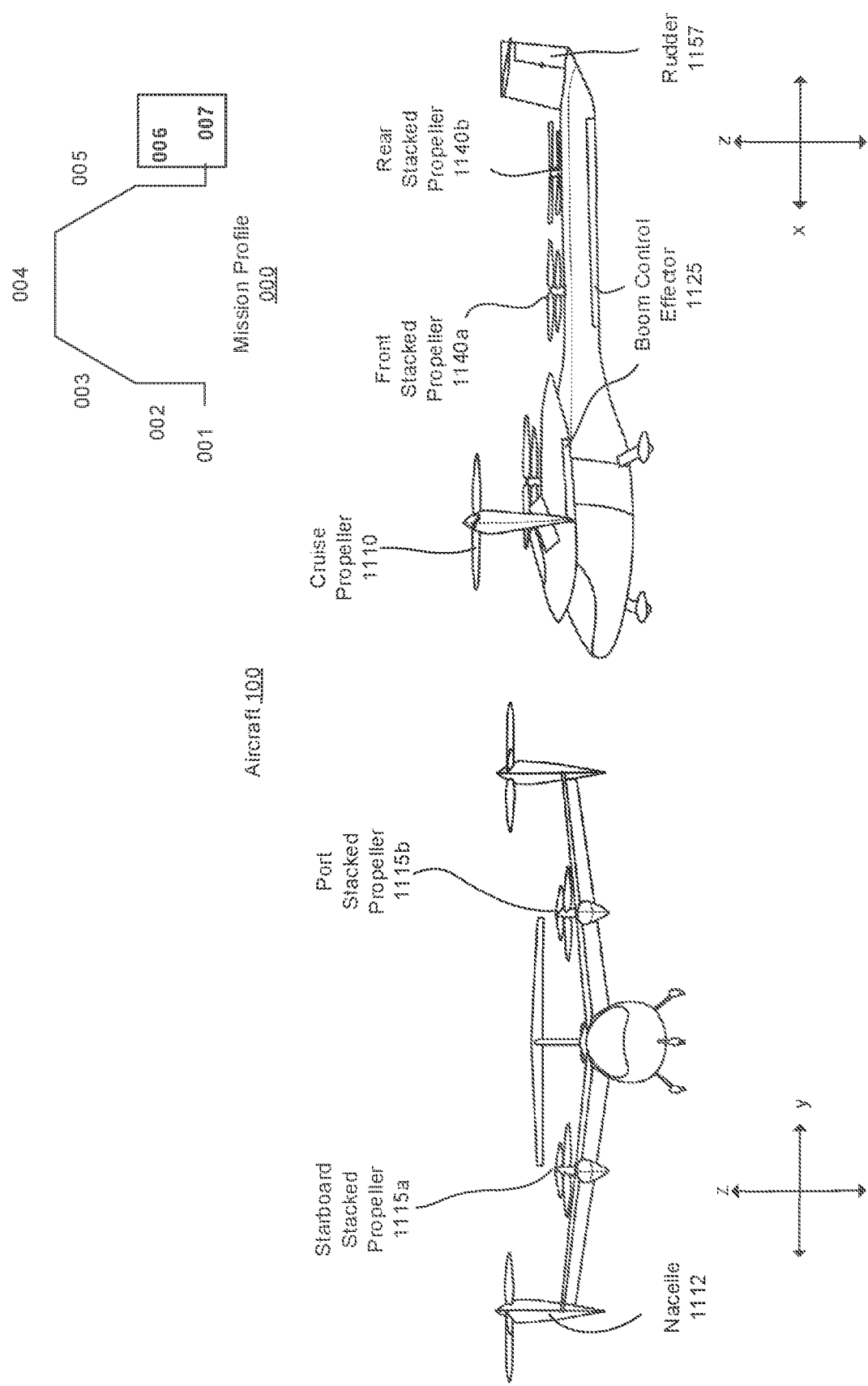
FIG. 11 illustrates a descent configuration of a VTOL aircraft, in accordance with the embodiment of FIG. 1.

FIG. 11 illustrates a descent configuration of a VTOL aircraft 100, in accordance with an embodiment. The descent stage 006 converts the aircraft from the ingress transition, stage 005, to a landing stage 007. As the aircraft 100 descends toward a landing area, the cruise propellers 1110, and the stacked propellers (e.g. starboard stacked propeller 1115a, port stacked propeller 915b, front stacked propeller 1140a, rear stacked propeller 1140b) rotate to generate lift. The stacked propellers function to provide lift for vertical landing and balance the aircraft during landing. The propellers decrease in rotational speed as the aircraft 100 touches down. The boom control effectors 1125 and the rudder 1157 may be titled for yaw control and noise control. The wing control surfaces 130 are pitched down to 40 degrees and the tail control surfaces 160 can lower to approximately 5 to 10 degrees to control pitch. After the aircraft 100 touches down, it returns to the parked configuration such that the propellers (e.g. starboard stacked propeller 1115a, port stacked propeller 1115b, front stacked propeller 1140a, rear stacked propeller 1140b) stop rotating. The boom control effectors 1125, the wing control surfaces 130, and the tail control surfaces 160 return to a neutral position.

The description of a stacked propeller used by the entities of FIGS. 5-11 can vary depending upon the embodiment and the requirements of the aircraft system. For example, the aircraft might include stacked propellers located along the fuselage or other areas of the aircraft. The aircraft may include more or less stacked propellers than those shown in FIGS. 5-11. The stacked propellers and/or aircraft may lack some elements included in the above description. The operation of the stacked propellers is not limited to the description of FIGS. 5-11. For example, the boom control effectors may be tilted or neutral in modes of operation not described above, depending on aircraft or environmental conditions.

Additional Considerations

The description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention.

The invention claimed is:

1. An aircraft comprising:
a fuselage having at least one passenger seat;
an M-wing coupled to the fuselage, the M-wing having a port portion and a starboard portion, the port portion and the starboard portion each including a first segment extending outwardly from the fuselage to a respective inflection point and a second segment extending outwardly from each inflection point, the first segment and the second segment joining at a non-zero angle at the inflection point;

a tail region extending from the fuselage and including a tail boom;

a set of propellers including a first propeller, a second propeller, and a third propeller, the first propeller is coupled to the port portion of the M-wing, the second propeller is coupled to the starboard portion of the M-wing, and the third propeller is coupled to the tail region;

a first wing boom attached to the port portion of the M-wing proximate to the inflection point of the port portion; and a second wing boom attached to the starboard portion of the M-wing proximate to the inflection point of the starboard portion, at least one of the first wing boom, the second wing boom, or the tail boom is hollow and is configured as a resonator tuned to a frequency of a propeller during a mode of operation.

2. The aircraft of claim 1, wherein at least one of the first wing boom, the second wing boom, or the tail boom includes a boom control effector configured to direct airflow generated by a propeller.

3. The aircraft of claim 1, wherein at least one of the first wing boom, the second wing, or the tail boom is hollow to retain a battery.

4. The aircraft of claim 1, wherein the first propeller is attached behind the M-wing to the first wing boom and the second propeller is attached behind the M-wing to the second wing boom.

5. The aircraft of claim 4, wherein the first propeller and the second propeller are located in front of a center of gravity of the aircraft.

6. The aircraft of claim 1, wherein the first propeller, the second propeller, and the third propeller each include a set of co-rotating propellers.

7. The aircraft of claim 1, further comprising:
a fourth propeller attached to the tail region of the aircraft, wherein the fourth propeller rotates in a direction opposite to the rotational direction of the third propeller during the mode of operation.

8. The aircraft of claim 1, wherein the non-zero angle is in a range from five degrees to twenty-five degrees.

9. The aircraft of claim 1, further comprising;
a fifth propeller attached to a first nacelle at a free end of the starboard portion of the M-wing; and
a sixth propeller attached to a second nacelle at a free end of the port portion of the M-wing.

10. The aircraft of claim 9, wherein the first nacelle and the second nacelle are configured to be perpendicular to the fuselage during the mode of operation and parallel to the fuselage during a second mode of operation.

11. The aircraft of claim 9, wherein the fifth propeller rotates in a direction opposite to the rotation of the sixth propeller during the mode of operation.

12. The aircraft of claim 1, wherein a total area of discs of the set of propellers yields a disc loading of less than 15.

13. The aircraft of claim 1, wherein the tail region includes a T-tail having a fin with a rudder configured to control yaw motion of the aircraft and a tail plane attached perpendicularly to the fin.

14. The aircraft of claim 13, wherein the tail plane includes a tail control surface configured to rotate about an axis parallel to the tail plane to control the pitch of the aircraft.

15. The aircraft of claim 1, further comprising an internal cavity located in one or more of the first wing boom, the second wing boom, or the tail boom, each internal cavity being configured to contain one of wherein the first propeller, the second propeller, or the third propeller during a second mode of operation.

16. The aircraft of claim 1, wherein the first propeller rotates in a direction opposite to the rotational direction of the second propeller during the mode of operation.

17. The aircraft of claim 1, further comprising:
a first motor coupled to the first propeller;
a second motor coupled to the second propeller; and
a third motor coupled to the third propeller.

18. An aircraft comprising:
a fuselage having at least one passenger seat;
an M-wing coupled to the fuselage, the M-wing having a port portion and a starboard portion, the port portion and the starboard portion each including a first segment extending outwardly from the fuselage to a respective inflection point and a second segment extending outwardly from each respective inflection point, the first segment and the second segment joining at a non-zero angle at the inflection point;
a tail region extending from the fuselage and including a tail boom;
a set of propellers including a first propeller, a second propeller, and a third propeller, the first propeller is coupled to the port portion of the M-wing, the second propeller is coupled to the starboard portion of the M-wing, and the third propeller is coupled to the tail region;
a first wing boom attached to the port portion of the M-wing proximate the inflection point of the port portion, the first propeller being attached behind the M-wing to the first wing boom; and
a second wing boom attached to the starboard portion of the M-wing proximate the inflection point of the starboard portion, the second propeller being attached behind the M-wing to the second wing boom.

19. The aircraft of claim 18, wherein the first propeller and the second propeller are located in front of a center of gravity of the aircraft.

* * * * *

UNITED STATES PATENT AND TRADEMARK OFFICE
CERTIFICATE OF CORRECTION

PATENT NO. : 11,174,019 B2
APPLICATION NO. : 16/179940
DATED : November 16, 2021
INVENTOR(S) : Moore et al.

Page 1 of 1

It is certified that error appears in the above-identified patent and that said Letters Patent is hereby corrected as shown below:

In the Claims

In Column 20, Line 17, in Claim 15, after "of", delete "wherein"

Signed and Sealed this
Eighth Day of February, 2022

Drew Hirshfeld
*Performing the Functions and Duties of the
Under Secretary of Commerce for Intellectual Property and
Director of the United States Patent and Trademark Office*